United States Patent [19]
Cherney

[11] 4,391,079
[45] Jul. 5, 1983

[54] CONTROL SYSTEM FOR CYCLIC MACHINES

[75] Inventor: Dale M. Cherney, Howards Grove, Wis.

[73] Assignee: Hayssen Manufacturing Company, Sheboygan, Wis.

[21] Appl. No.: 180,039

[22] Filed: Aug. 21, 1980

[51] Int. Cl.³ .................. B65B 41/18; B31B 1/10; G05B 19/28; G06F 15/46
[52] U.S. Cl. .................. 53/396; 53/51; 53/64; 53/450; 53/551; 318/602; 364/469; 493/11; 493/30
[58] Field of Search .................. 53/51, 64, 75, 396, 53/450, 551; 493/11, 30, 35; 364/469, 478; 318/602

[56] References Cited

U.S. PATENT DOCUMENTS

| | | | |
|---|---|---|---|
| 3,055,154 | 9/1962 | Markley et al. | 53/51 X |
| 3,943,683 | 3/1976 | Kovacs et al. | 53/51 |
| 4,023,327 | 5/1977 | Simmons | 53/51 |
| 4,038,805 | 8/1977 | Holladay et al. | 53/75 X |
| 4,081,944 | 4/1978 | Sjöstrand | 53/51 |
| 4,128,985 | 12/1978 | Simons | 53/51 |
| 4,142,237 | 2/1979 | Yamasaki | 364/469 |

Primary Examiner—John Sipos
Assistant Examiner—Charles L. Willis
Attorney, Agent, or Firm—Senniger, Powers, Leavitt and Roedel

[57] ABSTRACT

Method and apparatus for controlling a machine which is operable in cycles, the machine carrying out a plurality of functions during each cycle. Values representing the stages of the machine in its cycle are generated as the machine progresses through a cycle, the values being determined by the actual stage of the machine independently of time. Starting and stopping points in the cycle for at least one of the functions of the machine is preset in terms of the generated values. The generated values are compared with the preset starting and stopping point values. The machine function is initiated and maintained when the generated values are greater than the preset starting point value but are less than the preset stopping point value and the function is stopped when the generated values equal or are greater than the preset stopping point value. Apparatus and method for computing starting and stopping points for an eyespot window using only a single set of delay switches is also disclosed.

15 Claims, 18 Drawing Figures

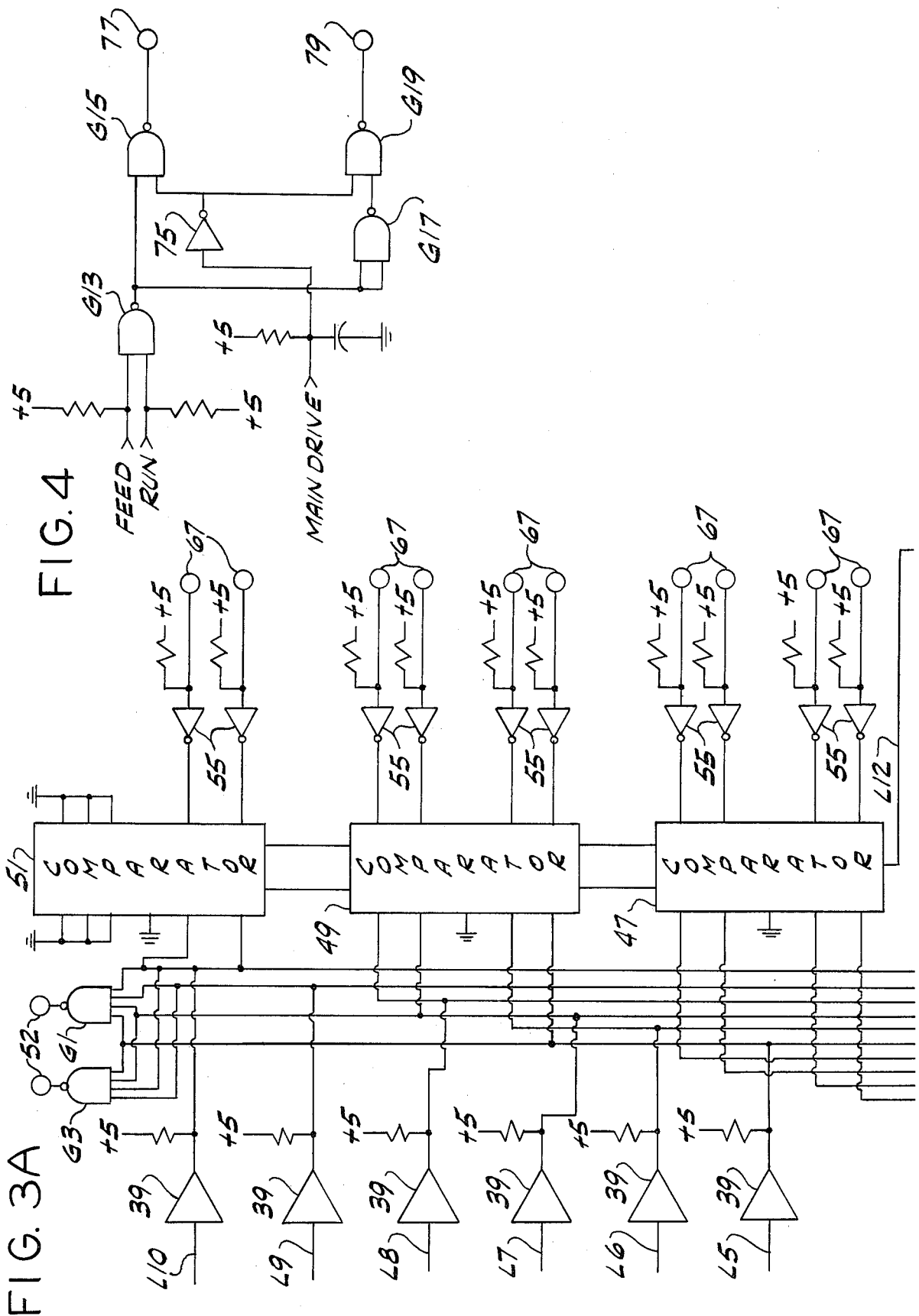

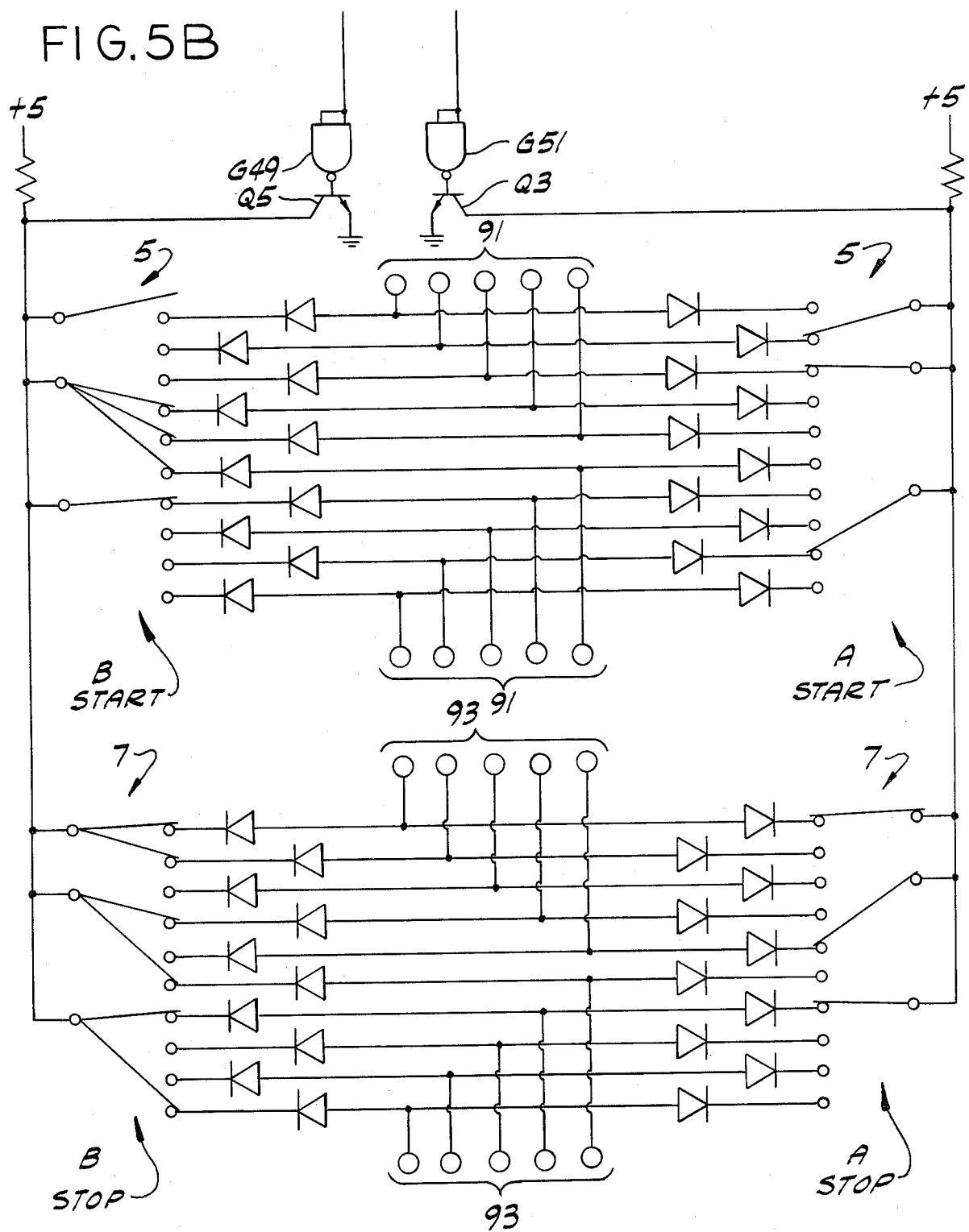

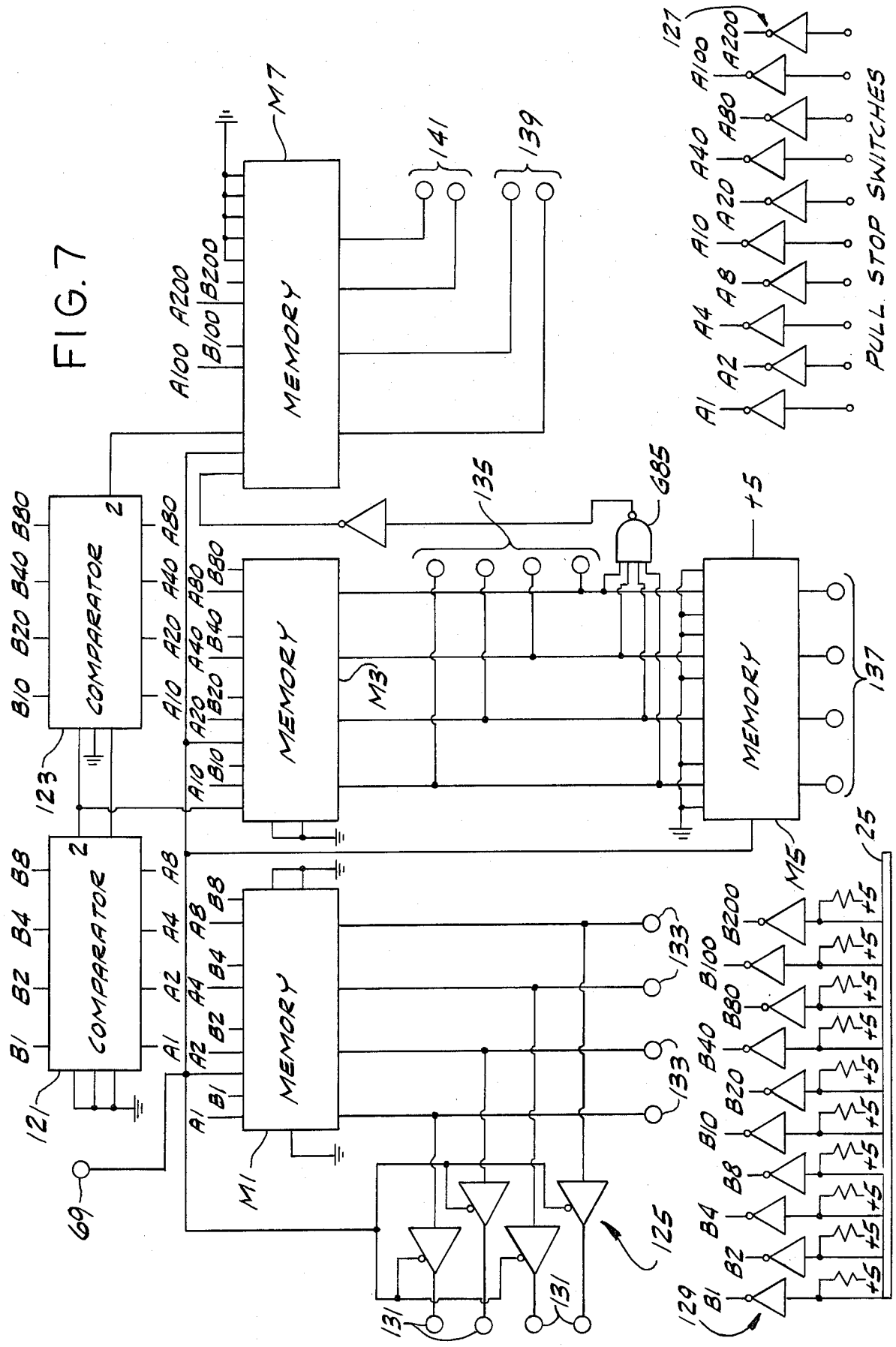

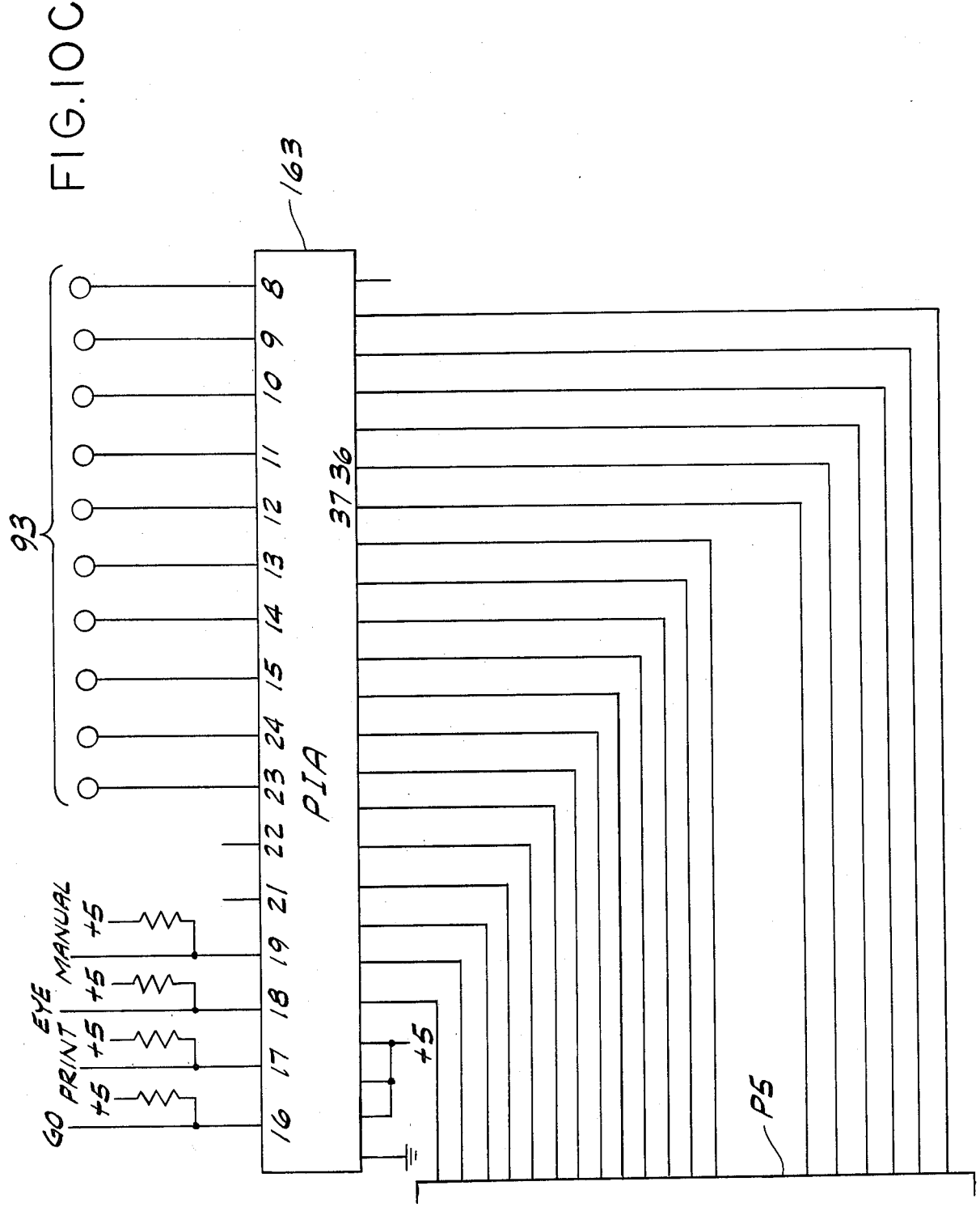

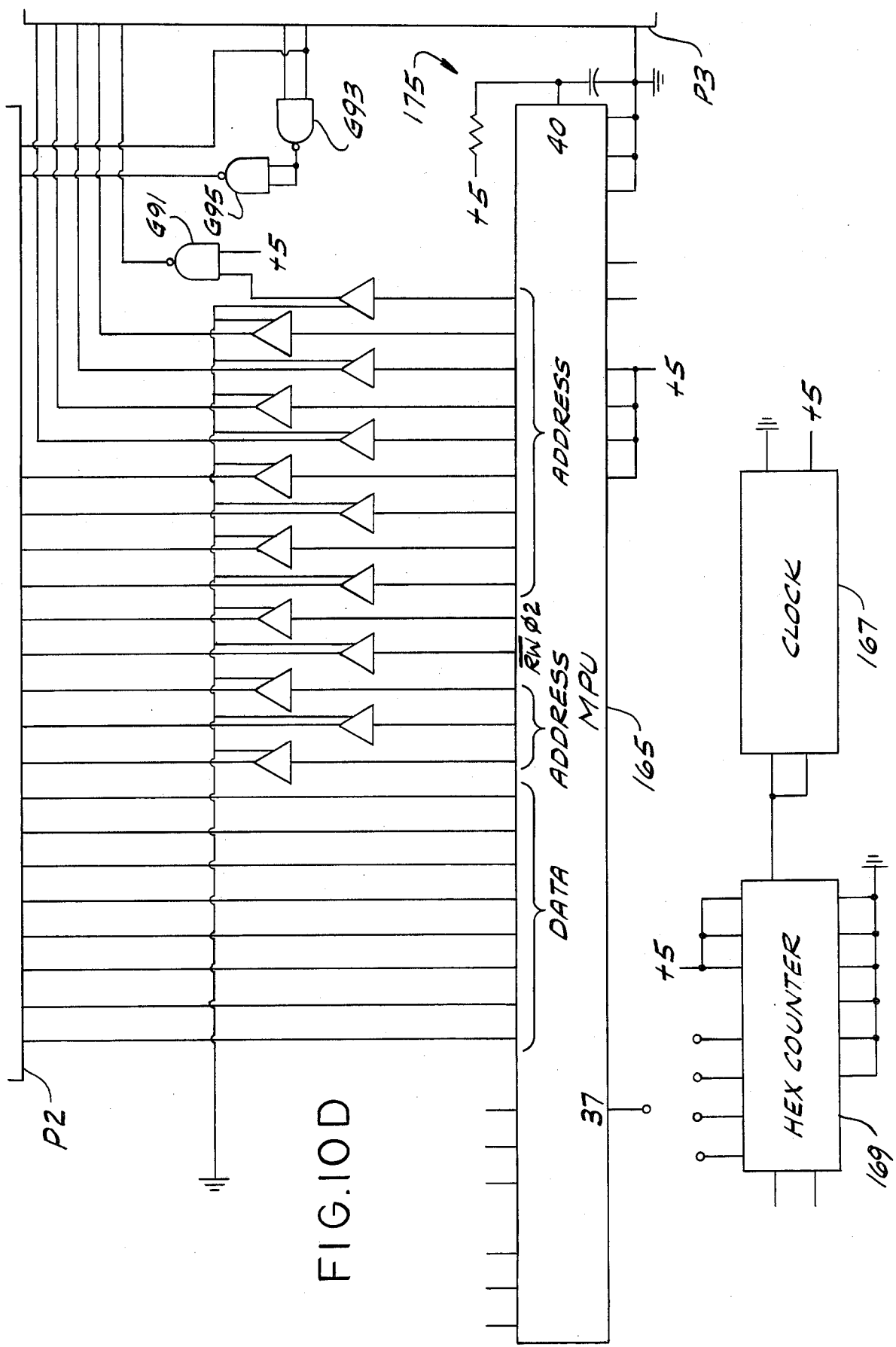

FIG.11A
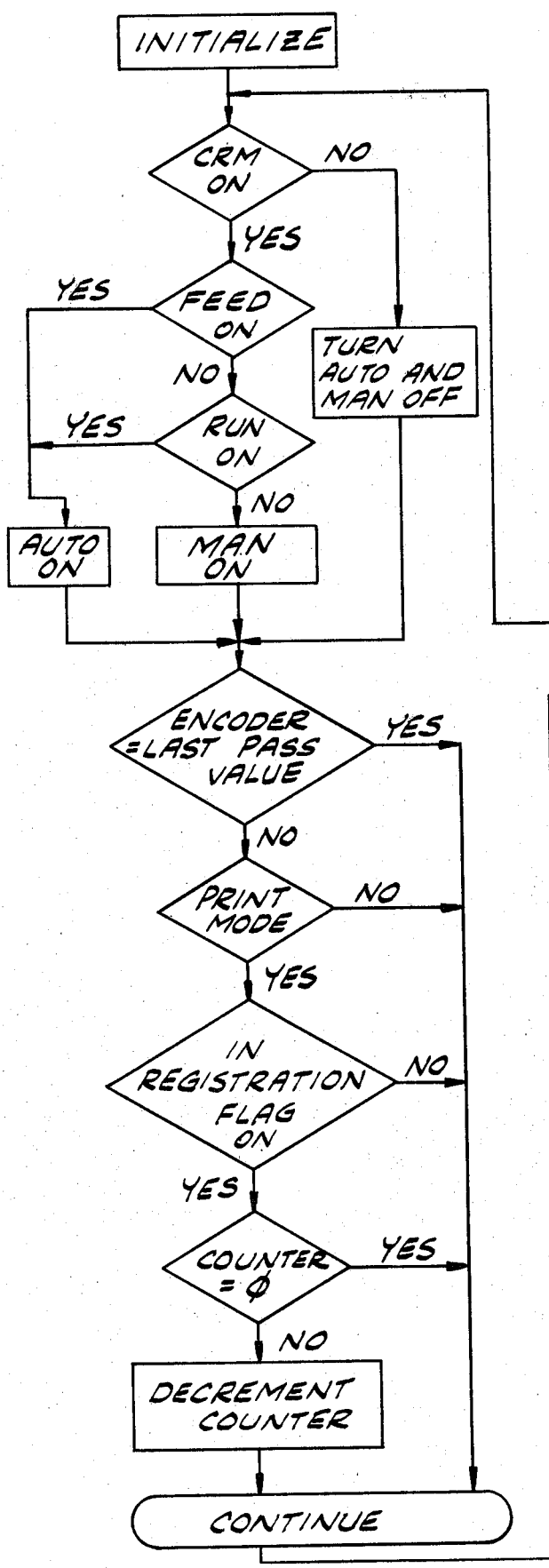
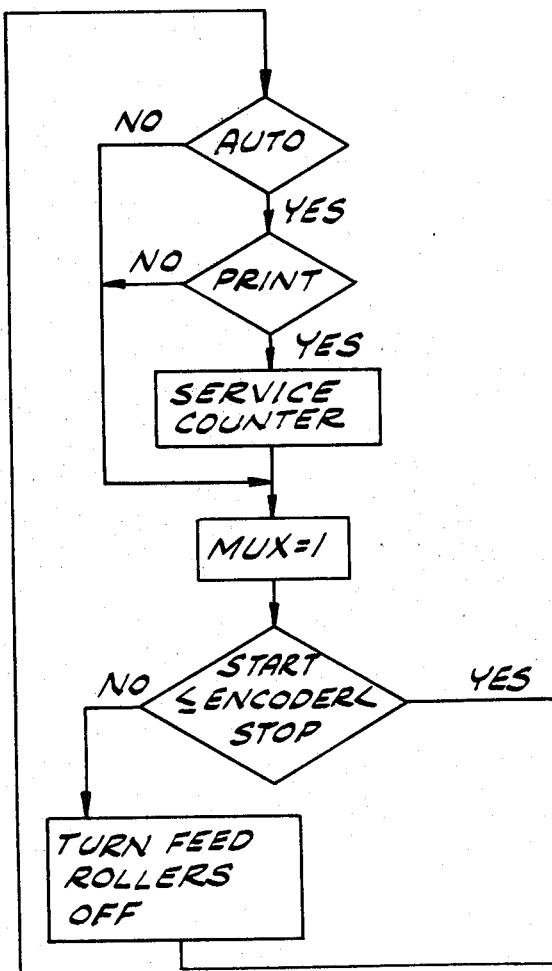

CONTROL SYSTEM FOR CYCLIC MACHINES

BACKGROUND OF THE INVENTION

This invention relates to control systems for machines and more particularly to control systems for cyclic machines (i.e. for machines which are operable in cycles).

Typically, cyclic machines carry out a number of functions during each cycle, each of which must start at a predetermined stage of the machine in its cycle (which stage may or may not be unique for each function) and stop at a second predetermined stage in the machine cycle (which again may or may not be unique for each function). These functions often are interrelated, and thus it is important that they start and stop as nearly as possible at the predetermined stages in the machine cycle. Cycle rates of 100, 200 or even 300 cycles/minute are not uncommon. At these rates, accurate control of several functions during each cycle is difficult.

For many years, control systems have used rotary cam actuated limit switches for controlling machine functions. But this requires that a fairly large number of cams be accurately positioned to strike the limit switches at precise stages in the machine cycle. Adjustment of the cams and switches is difficult. And failure after prolonged use is common because of mechanical wear and electrical deterioration of the switches. Particularly at higher cycle rates, cam based systems are unsatisfactory. Solid state control systems have been developed to address some of these problems, but present ones also have disadvantages. Foremost among these disadvantages is cost. Solid state control systems are relatively expensive to purchase. In addition some of these systems require additional programming before they can be used with a particular type of machine, which programming can also be expensive.

A second disadvantage of solid state control systems is that some are too complex for many machines, particularly for machines having only a relatively small number of functions and requiring only limited logic capability. For example, the packaging industry uses form, fill and seal machines which have only a few (e.g., six) functions to be controlled. Such functions might include the feeding of flexible packaging material to the machine, pulling or feeding the packaging material over a mandrel to form tubing and past a sealing station, opening and closing sealing bars or dies at the sealing station to form packages, cutting the packages apart, signalling a product feeding apparatus to feed more product to be packaged, etc. Such a machine is shown in coassigned U.S. patent application Ser. No. 69,828 now U.S. Pat. No. 4,288,965. These functions can be controlled by timers and in the case of a vertical form, fill and seal machine nine to twelve timers would be sufficient. Doing this causes an additional problem, however, whenever the speed of the machine is changed. When this happens all the timers must be readjusted. In fact, machine speed is usually not constant but instead varies over some small range which means that the timing of the functions will never be exactly right even at a nominally constant speed. This problem can be solved by making the machine speed truly constant, but this is expensive.

Previous form, fill and seal machines inhibited the operation of various functions to ensure that the functions occurred in proper order with respect to each other and with respect to the feeding of product to the machine. Concerning the latter, product feed is often an asynchronous operation with respect to the packaging machine. As a result, previous machines sometimes have to skip a cycle (which is called a "dry cycle") because the product at that particular time is not being supplied to the packaging machine at a high enough rate.

Another group of problems with previous form, fill and seal machines occurs when packaging material having registration marks is used to make packages. Generally, these registration marks (called "eyespots") are spaced at package length intervals along the material. If for some reason one of these registration marks is not detected by the machine, the machine quickly gets out of registration with the material. This is particularly a problem with printed packaging material. Another problem with printed packaging material is that the machine may mistake some of the printing for an eyespot, which again causes registration to be lost. A third problem, peculiar to a certain type of packaging machine, namely those having a "fixed eye" for detecting the registration marks, concerns synchronizing the sealing of a package with the detection of an eyespot. With a movable detector, the detector can simply be moved by the operator during set-up of the machine for a particular run of material until the sealing occurs at the proper place. With a machine having a "fixed eye", this is not always possible. Although "fixed eyes" can often be moved a few inches along the path of the packaging material, this is often not enough to permit sealing of the packages at the required spot. One possible solution to this problem is to provide a preset time delay between the detection of an eyespot and the sealing of the package. Doing this causes yet another problem, viz. a change in machine speed will cause the length of material fed past the sealing station during the preset time delay to vary, causing loss of registration.

SUMMARY OF THE INVENTION

Accordingly, among the several objects of this invention may be noted the provision of a method of and apparatus for accurately controlling functions of a cyclic machine; the provision of such a method and apparatus which eliminates the need for rotary cam actuated limit switches; the provision of such a method and apparatus which uses solid state components; the provision of such a method and apparatus which minimizes set-up cost and programming cost; the provision of such a method and apparatus which is suited for cyclic machines having a relatively small number of functions and requiring only limited logic capability; the provision of such a method and apparatus which controls the various functions without timers; the provision of such a method and apparatus which accurately controls the various functions even though the machine speed is not a constant; the provision of such a method and apparatus for use with packaging machines which eliminates the need to inhibit the timing of the various functions because of asynchronous product feed to the machine; the provision of such a method and apparatus for use with packaging machines which solves the problem of dry-cycling; the provision of such a method and apparatus for use with packaging machines which keeps the packaging material in proper registration; the provision of such a method and apparatus for use with packaging machines which solves the problem of mistaking printed matter on the packaging material for the registration marks; and the provision of such a method and apparatus for use with form, fill and seal machines having a fixed eye which accurately synchronizes the sealing of a package with the detection of a registration mark without the use of a time delay.

In general, in carrying out the method of this invention of controlling a machine which is operable in cycles, the machine carrying out a plurality of functions during each cycle, values representing the stages of the machine in its cycle are generated as the machine progresses through a cycle, the values being determined by the actual stage of the machine independently of time. Starting and stopping points in the cycle for at least one of the functions of the machine are preset in terms of the generated values. The generated values representing the stages of the machine in its cycle are compared with the preset starting and stopping point values. The machine function is initiated and maintained when the values representing the stages of the machine in its cycle are greater than the preset starting point value but are less than the preset stopping point value and the function is stopped when the values representing the stages of the machine in its cycle equal or are greater than the preset stopping point value.

Apparatus of this invention carries out this method and generally comprises means for generating values representing the stages of the machine in its cycle as the machine progresses through a cycle, the values being determined by the actual stage of the machine independently of time, means for presetting starting and stopping points in the cycle for at least one of the functions of the machine in terms of the values, and means for comparing the values representing the stages for the machine in its cycle with the preset starting and stopping point values. The apparatus also includes means for initiating and maintaining the machine function when the values representing the stages of the machine in its cycle are greater than the preset starting point value but are less than the preset stopping point value, and means for stopping the machine function when the values representing the stages of the machine in its cycle equal or are greater than the preset stopping point value.

Other objects and features will be in part apparent and in part pointed out hereinafter.

BRIEF DESCRIPTION OF THE DRAWINGS

FIGS. 3A and 3B are electrical schematic diagrams of the comparator section of the first embodiment of this invention;

FIG. 4 is an electrical schematic diagram of logic circuitry for the mode control function of the first embodiment of this invention;

FIGS. 5A and 5B are electrical schematic diagrams of the standard function control circuit of this invention;

FIG. 7 is an electrical schematic of the window computing circuit of the first embodiment of this invention;

FIGS. 10A-10E are electrical schematic diagrams of the microprocessor section of the second embodiment of this invention; and FIGS. 11A and 11B are a flow chart of the program for the microprocessor section of FIGS. 10A-11E.

Corresponding reference characters indicate corresponding parts throughout the several views of the drawings.

DESCRIPTION OF THE PREFERRED EMBODIMENTS

Figure 1:
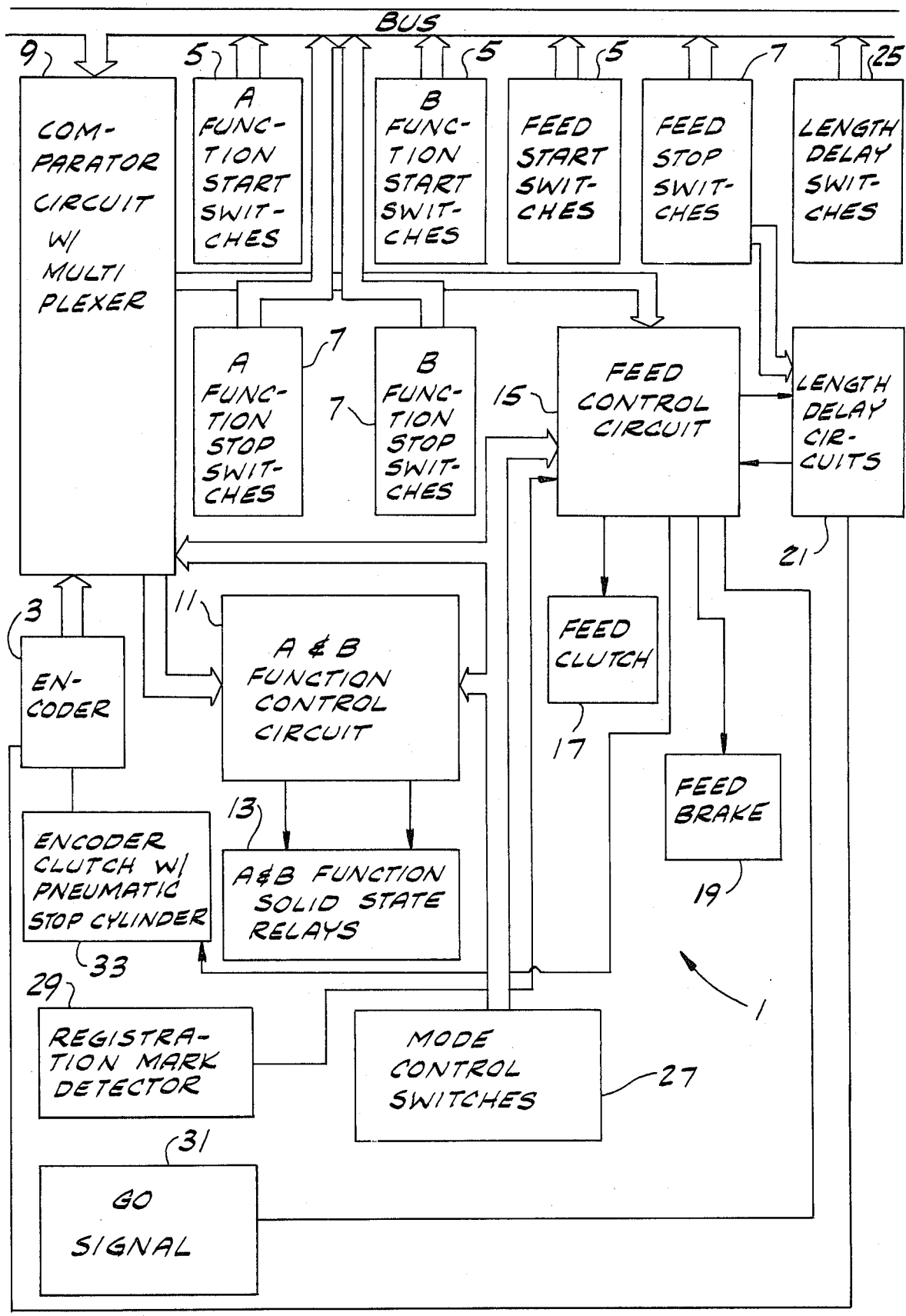
FIG. 1 is a block diagram of the major parts of a first embodiment of the control system of this invention.

Referring to FIG. 1 of the drawings, there is generally indicated at 1 a block diagram of a first embodiment of a control circuit for controlling a machine which is operable in cycles, which machine carries out a plurality of functions during each cycle. In particular, this block diagram shows such a circuit for controlling a vertical form, fill and seal machine such as that shown in the abovementioned Ser. No. 69,828 now U.S. Pat. No. 4,288,965, i.e., a machine for sealing packages wherein a web of flexible packaging material is formed into tubing and fed past sealing means for sealing the tubing to form packages, although the present invention is not limited to such machines. Typical functions which are controlled by control circuit 1 include the feeding of flexible packaging material to the machine, pulling or feeding the packaging material over a mandrel to form tubing and past a sealing station, opening and closing sealing bars or dies at the sealing station to form packages, and cutting the packages apart. Control circuit 1 includes an encoder 3, a plurality of switches for setting starting and stopping points in each cycle for each function, the starting point switches being labelled 5 and the stopping point switches being labelled 7, a comparator section 9 with a multiplexer, a function control circuit 11 which controls associated function relays 13, a feed or pull control circuit 15 which through a feed clutch 17 and a feed brake 19 controls the feeding of packaging material through the machine, a length delay circuit 21 connected to the feed or pull stop switches 7, a set of length delay switches 25, a plurality of mode control switches labelled collectively 27, a registration mark detector 29, and a GO input 31. In the particular system shown in FIG. 1, values representing the stages of the machine in its cycle, which values are determined by the actual stage of the machine independently of time, are supplied by encoder 3. Encoder is an absolute optical encoder such as that sold under model number SBD26-360G3 by Litton Systems Inc., Encoder Division, Chatsworth, Calif. It supplies values representing the machine stage in degrees (a complete cycle of the machine being from 0 degrees to 359 degrees) directly to comparator 9 via ten lines L1-L10, each line representing one digit of the binary coded decimal form of the degree value. That is, the values lines L1-L10 respectively represent are 1, 2, 4, 8, 10, 20, 40, 80, 100, and 200. Any stage from 0 to 359 degrees can be uniquely represented on these ten lines. The construction of the abovementioned absolute optical encoder is such that a unique code is generated for each degree regardless of the direction of rotation of the machine or power outages.

The encoder is mounted directly to the gearbox (not shown) of the machine to provide a 1:1 relationship between the machine and the signal supplied by the encoder to the comparator. Thus, encoder 3 constitutes means for generating values representing the stages of the machine in its cycle as the machine progresses through a cycle.

Physically, the encoder is controlled by a slip clutch 33 within the gearbox, which slip clutch is in turn controlled by a pneumatic stop cylinder. The stop cylinder allows the machine to progress through its stages from 0 degrees to somewhere between 350 and 359 degrees at which point the stop cylinder stops the progression, unless and until GO input 31 supplies a "go" signal, which indicates for example that the generally asynchronous product feed system (not shown) has supplied an amount of product sufficient to fill the package being formed by the machine and hence the machine can begin the next cycle. Alternatively, a "go" signal could also be supplied from a system for removing the package from the machine. In either event the "go" signal represents the fact that the machine can now proceed with the next cycle. The cyclically operating machine, in this case the form, fill and seal machine, operates as the slave of the product feed or the package take away system.

All functions with the exception of the packaging material feed control function are activated by identical function control circuits 11 in this embodiment. Two machine functions are controlled by a single printed circuit board, which is represented by function control circuit 11. For generality these functions are referred to as the A function and the B function, although these functions can be any of the machine functions listed above. It is understood that although only one such control circuit 11 is shown, in practice control circuit 1 includes several function boards 11. For example, when ten functions are to be controlled, there will be five control circuits 11. Associated with each function board are the starting point and stopping point switches for each function. When a two-sided printed circuit board is used, the starting and stopping point switches for the A function are mounted on one side of the board and those for the B function are mounted on the other. The starting and stopping point switches are connected via a bus to comparator section 9 and constitute means for presetting starting and stopping points in the cycle for their respective functions of the machine in terms of the values supplied by the encoder. Since the encoder represents the stages of the machine in degrees, the switches also represent degree starting and stopping points. In fact, the switches represent these points in binary coded decimal form. The outputs of the function control circuits can be 3 to 60 volts DC at 3 amps or 120 VAC at 3 amps depending on the apparatus to which the outputs are attached.

Comparator section 9 constitutes means for comparing the values supplied by the encoder representing the stages of the machine in its cycle with the preset starting and stopping point values for each machine function. The results of these comparisons are supplied from the comparator to the corresponding function control circuits. The control circuits together with their respective function solid-state relays constitute means for initiating and maintaining their respective machine functions when the values representing the stages of the machine in its cycle are greater than the preset starting point value for that function but are less than the preset stopping point value and constitute means for stopping their respective machine functions when the values representing the stages of the machine in its cycle equal or are greater than the corresponding preset stopping point values.

In this particular embodiment of the invention, feed control circuit 15 includes means for idling the machine, by keeping the aforementioned pneumatic stop cylinder extended, thereby retaining the machine at the respective stage in its cycle (e.g., between 350 and 359 degrees) and holding the value comparison substantially the same, and means for recommencing cyclic operation of the machine by retracting the pneumatic stop cylinder. The feed control circuits's major function is to control the feeding of the flexible packaging material through the machine and past the sealing bats or other sealing means. This is accomplished by control of feed clutch 17 and feed brake 19. In brief, when comparator section 9 determines that the machine stage is greater than the preset feed starting point, it signals feed control circuit 15 to start the feed of material and when it determines that the machine stage is equal to or greater than the preset feed stopping point, it signals circuit 15 to stop the feeding of material.

The length delay circuit and its length delay switches are closely associated with the feed control circuit but are used only when the packaging material includes registration marks. This statement is also true of the registration mark detector, which can be any of a number of commercially available detectors. Turning to the final item on FIG. 1, the mode control switches, these switches enable the operator to operate the machine in various modes such as automatic, manual, and print. In the automatic mode the main drive of the machine is on and either the feed system is activated or the bag making system is activated. In the manual mode the main drive is on but the feed system and the bag making function are off. The manual mode switch is simply a momentary selector switch or pushbutton controlling an input of each output function. The print mode is used when packaging material with registration marks is being used to form packages. Other mode switches are mentioned as needed hereinafter. In addition, the operator can turn functions on or off at will by means of function enable selector switches included in the mode control switch section.

Figure 2:
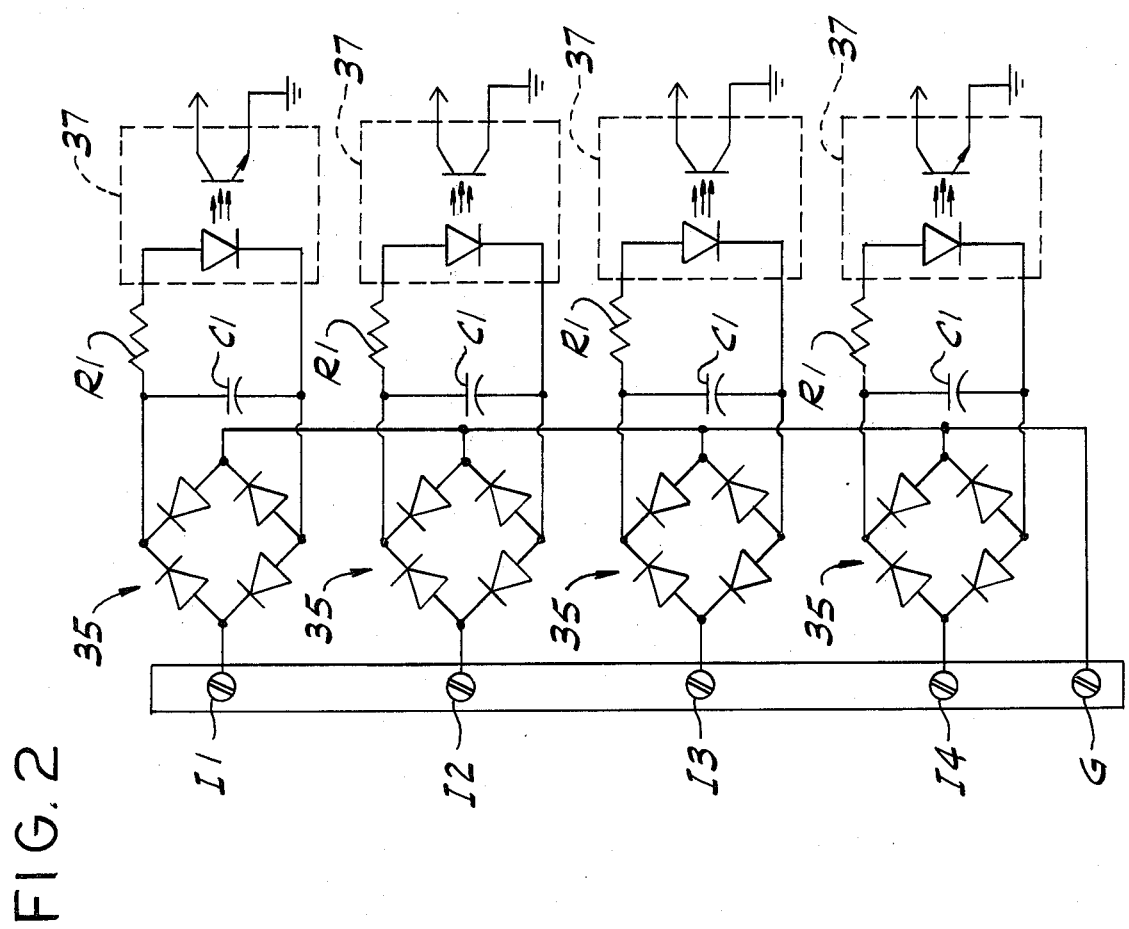
FIG. 2 is an electrical schematic diagram of a typical input portion for the circuitry of the control system of FIG. 1.

Turning to the detailed circuit diagrams, there is shown in FIG. 2 an input terminal strip for a typical function control circuit 11. Four inputs I1–I4 are provided per circuit with a common terminal G. All inputs are 15 volts DC and are brought in through bridge rectifiers 35 to make the input polarity-insensitive. The output of each bridge is filtered by a capacitor C1 to inhibit any false actuations due to electrically induced noise and fed through a current limiting resistor R1 to an optical isolator 37 to insure complete logic isolation. Likewise, all outputs are optically coupled to ensure output isolation.

Figure 3B:
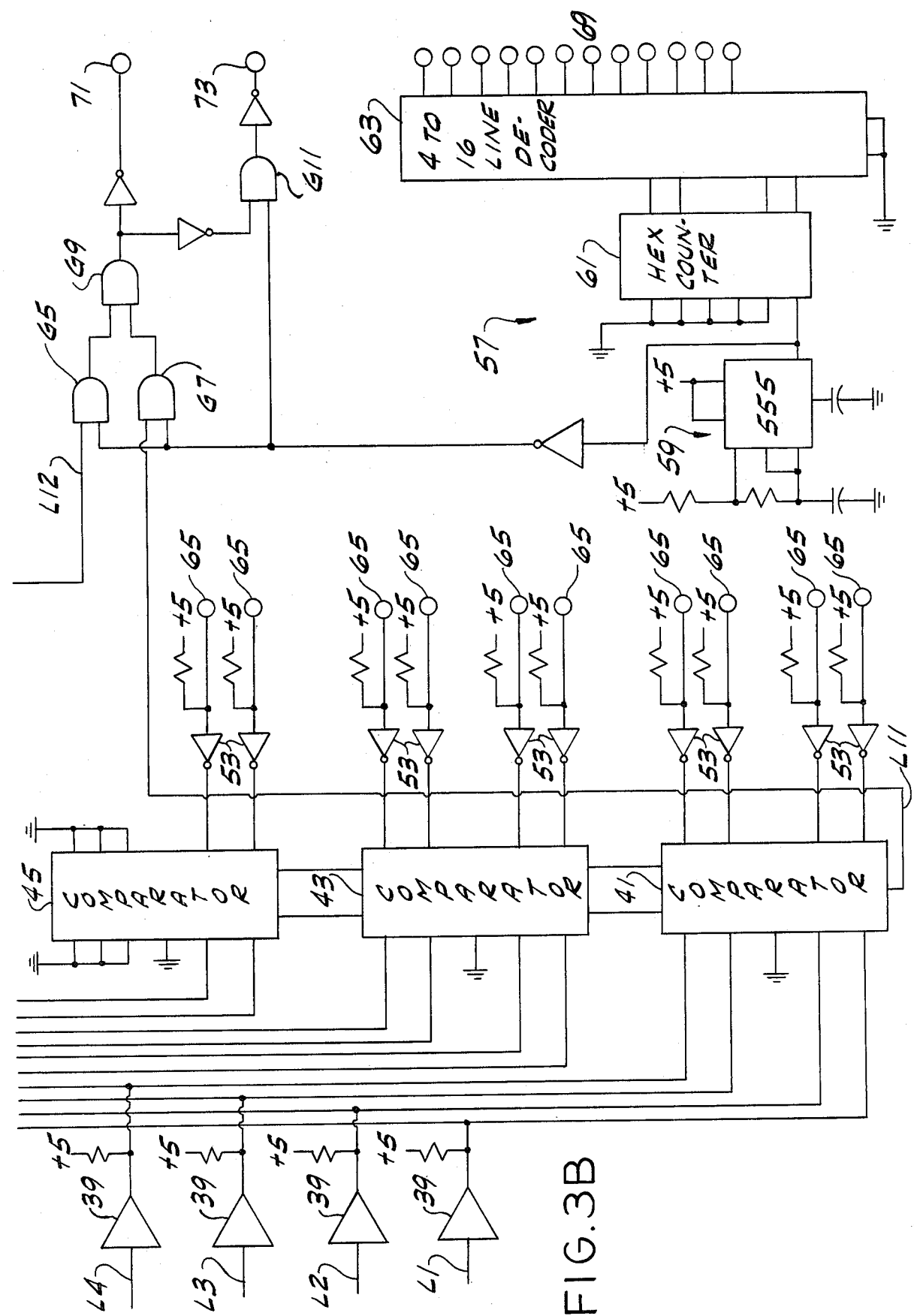

Comparator section 9 (shown in detail in FIGS. 3A & 3B) includes a set of ten buffers 39 connected to the ten lines from the encoder, six comparators 41, 43, 45, 47, 49, and 51, a pair of NAND gates G1 and G3, a set of ten inverting buffers 53 connected via the bus to the starting point switches, a set of ten inverting buffers 55 connected via the bus to the stopping point switches, four AND gates G5, G7, G9, and G11, and a multiplexer 57 comprising a 555-based oscillator 59 with a thirty microsecond period (fifteen microsecond on time and fifteen microseconds off), a hexadecimal counter 61, and a four-line to sixteen-line decoder 63.

As stated above, comparator section 9 compares the preset start and stop points for each function with the machine stage as represented by the values on lines L1–L10 from the encoder. Buffers 39 ensure that there is only a single unit load on the encoder lines and that the encoder lines are isolated from the comparators. The inputs to NAND gates G1 and G3 are connected to the lines representing 200, 100, 40, and 10 degrees and therefore their outputs go to a logic Low whenever the machine is between 350 and 359 degrees. This Low is supplied via a pair of pins 52 to the feed control circuit, and if desired to the product feed or takeaway sections of the system signifying that the machine is "ready".

Comparators 41, 43, and 45 compare the machine stage to the preset starting point of whatever function is selected by the multiplexer at that time. Signals representing the selected preset starting point appear on the bus in inverted, binary coded decimal form when the corresponding function is selected by the multiplexer and as a result appear at the pins labelled 65. These signals are inverted by inverting buffers 53 and then supplied to comparators 41, 43, and 45, which compare them to the corresponding lines from the encoder. Comparators 41, 43, and 45 are cascaded together to have a single output, on a line L11, which goes High only when the machine stage is greater than the preset function starting point being compared. Line L11 supplies this output to one input of AND gate G7.

Similarly, a signal in inverted binary coded decimal form representing the preset stopping point of the selected function is supplied via the bus to pins 67 on the comparator section. This signal is inverted by inverting buffers 55 and then supplied to comparators 47, 49 and 51. These comparators are also cascaded together to have a single output which is supplied on a line L12 to one input of AND gate G5. This output of comparators 47, 49 and 51 goes High only when the machine stage is less than the preset function stopping point being compared.

The output of oscillator 59 in multiplexer 57 is High (i.e., in time state TS1) for fifteen microseconds out of every thirty microsecond period. The leading edge of this High signal increments the hexadecimal counter causing its output to be incremented by one and causing the 4-line to 16-line decoder to select the next line by making the appropriate line go Low. The output lines of the decoder are shown connected to pins 69. As is explained below, each output line of the decoder addresses a different function. When a given address line goes Low, the corresponding function starting and stopping point switches are enabled. The address from the decoder is present on the bus for time state TS1 (when the oscillator output is High) and for time state TS2 (when the output is Low), and thus is present on the bus for a total of thirty microseconds. During time state TS1, the signals from the selected starting point and stopping point switches appear at the comparators and the output signals therefrom appear at AND gates G5 and G7. During time state TS2, these gates, along with AND gate G11, are enabled by an inverted signal from oscillator 59. If during this time state the machine stage is greater than the preset starting point for the selected function and less than the preset stopping point, the outputs of both gages G5 and G7 will be High, causing the output of AND gate G9 to go High as well. This High output is inverted and supplied via a pin 71 and the bus to the corresponding function control circuit where, as is explained below, it sets a flip-flop and thereby causes the selected function to be enabled. Thus, the output of comparator section 9 that appears at pin 71 can be considered a SET output. The output of gate G9 is supplied through an inverter to gate G11 and therefore so long as the output of gate G9 is High the output of gate G11 is held Low. This Low is inverted and supplied via a pin 73 and the bus to the reset input of the aforementioned flip-flop in the selected function control circuit. During time state TS1 the outputs of gates G5, G7 and G11 are all Low and hence the signal levels on pins 71 and 73 are both High. Accordingly, the selected flip-flop remains set during time state TS1.

Of course, whenever the machine stage is not between the preset starting and stopping points, the output of either gate G5 or gate G7 will be Low during time state TS2. This causes the output of gate G9 to be Low as well. This Low is inverted and the resulting High is supplied to gate G11, which causes its output to go High. This High is inverted and supplied to pin 73, thereby causing the selected flip-flop to be reset. As is explaind below, this ensures that the selected function is disabled whenever the machine stage is outside the preset range for that function.

Logic circuitry for the mode control function of control circuit 1 is shown in FIG. 4. This logic circuitry includes four NAND gates G13, G15, G17, and G19, an inverter 75, and two output pins 77 and 79. The inputs to gate G13 are connected to the input circuitry of FIG. 2 whose inputs are switches which indicate whether the feed and run functions are on, while the input to inverter 75 is a signal indicative of whether the machines main drive is on. If either the feed or run function is on, the output of gate G13 is High. This High is inverted by gate G17 and the resulting Low is supplied to gate G19, causing its output to go High. This High output is supplied to pin 79. If the main drive is also on at the same time, the output of inverter 75 is High. As a result, both inputs to gate G15 are High and its output is Low. This Low is supplied to output pin 77 and it indicates the fact that the machine is in the automatic mode, i.e., main drive on and either feed or run on.

In the manual mode, on the other hand, both the feed and run switches are off, which causes both inputs to gate G13 to be High and its output to be Low. In this case, the output of gate G15, and therefore pin 77, goes High. The Low output of gate G13 also causes the output of gate G17 to go High. If the main machine drive is on at the same time, both inputs to gate G19 are therefore High and its output goes Low. This Low is supplied to pin 79 and it indicates the fact that the machine is in the manual mode, i.e., main drive on and both feed and run switches off. Thus, pins 77 and 79 provide signals to the rest of control circuit 1 which indicate whether the machine is in the automatic or the manual mode, respectively.

Figure 5A:
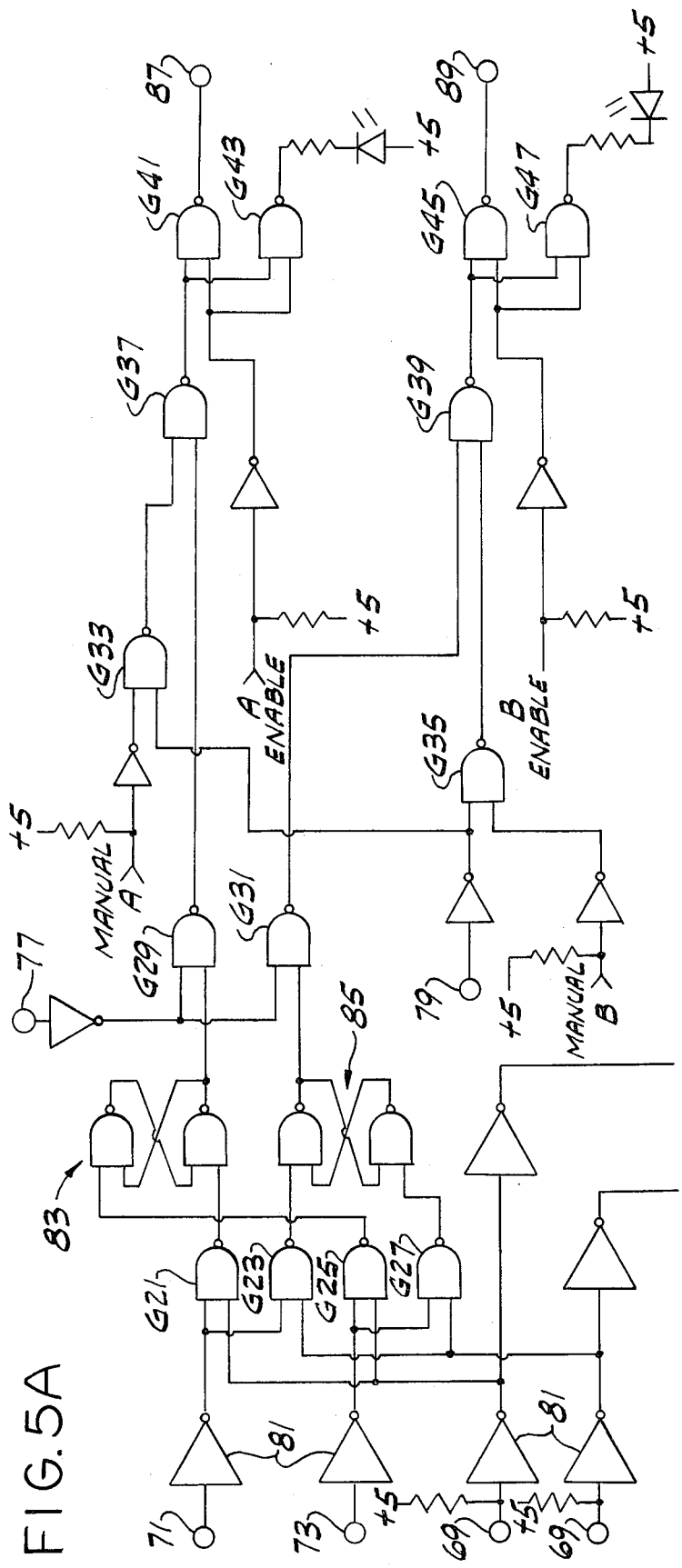

Function control board 11 (shown in FIGS. 5A and 5B) is the universal expansion module of the system. In the present embodiment up to five function boards can be used with the system for a total of ten functions. Two identical functions are on each board, the A function and the B function. Function control circuit 11 includes four input inverters 81 connected to inputs of four NAND gates G21, G23, G25 and G27 respectively, an A function flip-flop 83, a B function flip-flop 85, a number of additional inverters, twelve additional NAND gates G29, G31, G33, G35, G37, G39, G41, G43, G45, G47, G49, and G51, and two output pins 87 and 89. Also shown on FIG. 5B are the preset starting and stopping point switches for the A and B functions, the A function switches being shown on the right, the B function switches being shown on the left, the starting point switches being shown on the top and the stopping point switches being shown on the bottom. Also shown are a plurality of decoupling diodes for decoupling the switches from the bus when the switches are deselected. For illustrative purposes, the A function starting point switches have been set to 182 degrees, the A function stopping point switches have been set to 228 degrees, the B function starting point switches have been set to 78 degrees, and the B function stopping point switches have been set to 359 degrees. Since these switches are binary coded decimal switches, more than one contact per switch can be contacted at a given time. This is especially illustrated with the B function switches. The B function stop switches also illustrate another feature of the present circuitry. These switches are set to 359 degrees, which lies in the idle period. This is done when it is desired to maintain a function on throughout the idle period. Once the idle period ends, the function will of course go off. The binary coded decimal outputs of the starting and stopping point switches are supplied to the rest of the system via a plurality of pins 91 and 93.

To illustrate the operation of the function control circuit, assume that the multiplexer has addressed the A function. As a result, the corresponding pin 69, in this case the second from the bottom on FIG. 5A, goes Low. This Low is inverted by the corresponding inverter 81 and the resulting High is reinverted and supplied to gate G51 (see FIG. 5B). The output of gate G51 goes High, turning on an NPN transistor Q3. When transistor Q3 conducts, it activates the A function start and stop switches by driving the switch commons to ground. Of course, the data thereupon appears via pins 91 on the bus in inverted form. In this way, the A function start and stop switches are held on the bus for time states TS1 and TS2. The comparator, as described above, compares these switch values with the machine stage and if necessary sends out set or reset signals over pins 71 and 73 during time state TS2. For the moment assume that the comparison resulted in the set pin going Low. This Low is inverted by the corresponding inverter 81 and the resulting High is supplied to gate G21 (which is associated with the A function) and to gate G23 (which is associated with the B function). Because the multiplexer is addressing the A function at this time but not the B function, the other input to gate G21 is High but the other input to gate G23 is Low. The output of gate G21 goes Low, which sets the A function flip-flop, flip-flop 83. The B function flip-flop is not set, since the output of gate G23 is High at this time. The output of the A function flip-flop is connected to one input of gate G29, the other input of which is connected through an inverter to pin 77 from the mode control logic circuitry shown in FIG. 4. When pin 77 is Low, which means that the machine is in the automatic mode, both inputs to gate G29 are High and its output goes Low. This Low is supplied to gate G37, causing its output to go High. The output of gate G37 is supplied to one input of gate G41. The other input of gate G41 is connected through an inverter to the A function enable switch, Assuming that the operator has enabled function A, the A enable signal is Low and the corresponding input to gate G41 is High. As a result, the output of gate G41 goes Low. This Low is supplied via pin 87 to the corresponding function relay 13 to activate the A function. At the same time the output of gate G43 goes Low, causing an indicator light to light, thereby displaying the fact that the A function has been activated.

Moving farther along in the machine cycle, assume now that the stage has been reached where the A function is to be deactivated. When this occurs, the comparator output on pin 73 goes Low during time state TS2. This Low is inverted and the resulting High is supplied to gates G25 (which is associated with the A function) and G27 (which is associated with the B function). Since the A function is the one selected at this time, the other input to gate G25 is High and the other input to gate G27 is Low. The output of gate G25 thereupon goes Low, resetting the A function flip-flop. The output of the A function flip-flop goes Low, with the result that the output of gate G29 goes High, the output of gate G37 goes Low and the outputs of gates G41 and G43 go High. This deenergizes the A function relay and turns off the A function indicator light.

The B function circuitry functions in an identical fashion. When the multiplexer selects the B function, the bottommost pin 69 on FIG. 5A goes Low, which Low is inverted twice and supplied to gate G49 (FIG. 5B). The output of gate G49 goes High causing an NPN transistor Q5 to conduct, thereby activating the B function start and stop switches. The comparator reads these switches and, if necessary, changes the logic levels on pins 71 and 73. Since the B function is selected, it is gates G23 and G27 which are enabled. As a result a Low on pin 71 causes the B flip-flop to be set, by the action of gate G23, and a Low on pin 73 causes the B flip-flop to be reset, by the action of gate G27 during time state TS2. The output of the B flip-flop is supplied to one of the inputs of gate G31. When this flip-flop is set and the machine is in the automatic mode, the output of gate G31 is Low. This Low is supplied to gate G39, where it is inverted. The resulting High is supplied to one input of gate G45. If the B function enable switch is closed, the other input to gate G45 is also High and its output is Low, as is that of gate G47. The resulting Low on pin 89 causes the B function relay to be energized and the Low output of gate G47 causes the B function indicator light to light, Likewise, a Low on the reset input causes the outputs of gates G45 and G47 to go High, thereby deenergizing the B function relay and turning off the B function indicator light.

In the manual mode, the input to function control circuit 11 on pin 79 is Low. This Low is inverted and supplied to gates G33 and G35. Assuming that the operator has elected to operate the A function manually (by closing the appropriate switch indicated on FIG. 5A by the label MANUAL A), the other input to gate G33 is also High and its output goes Low. This Low causes the output of gate G37 to go High and, since the A function is enabled, the output of gate G41 to go Low, thereby energizing the A function relay. The A function remains on only so long as the MANUAL A switch is held closed and the A function is enabled. Likewise, if the MANUAL B switch is closed, both inputs to gate G35 are High, the output of that gate is Low, the output of gate G39 is High and the output of gate G45 is Low, thereby energizing the B function relay. The appropriate indicator lights come on in exactly the same way as in the automatic mode.

Feed control circuit 15 (FIG. 6) is similar to function control circuit 11 in this first embodiment but there are some important differences. The feed control circuit includes four input inverters 95, four input NAND gates G53, G55, G57, and G59, and a pair of flip-flops 97 and 99. Flip-flop 97 is called the pull flip-flop (signifying that packaging material is to be pulled or fed past the sealing station of the machine) and flip-flop 99 is called the window flip-flop (signifying that a "window" along the length of the packaging material is needed in which to look for the registration mark). The feed control circuit also includes a number of additional inverters, twelve additional NAND gates G61, G63, G65, G67, G69, G71, G73, G75, G77, G79, G81, and G83, an additional flip-flop 101, an NPN transistor Q7 which need not be a discrete device, and a set of tri-state buffers 103.

Figure 6:
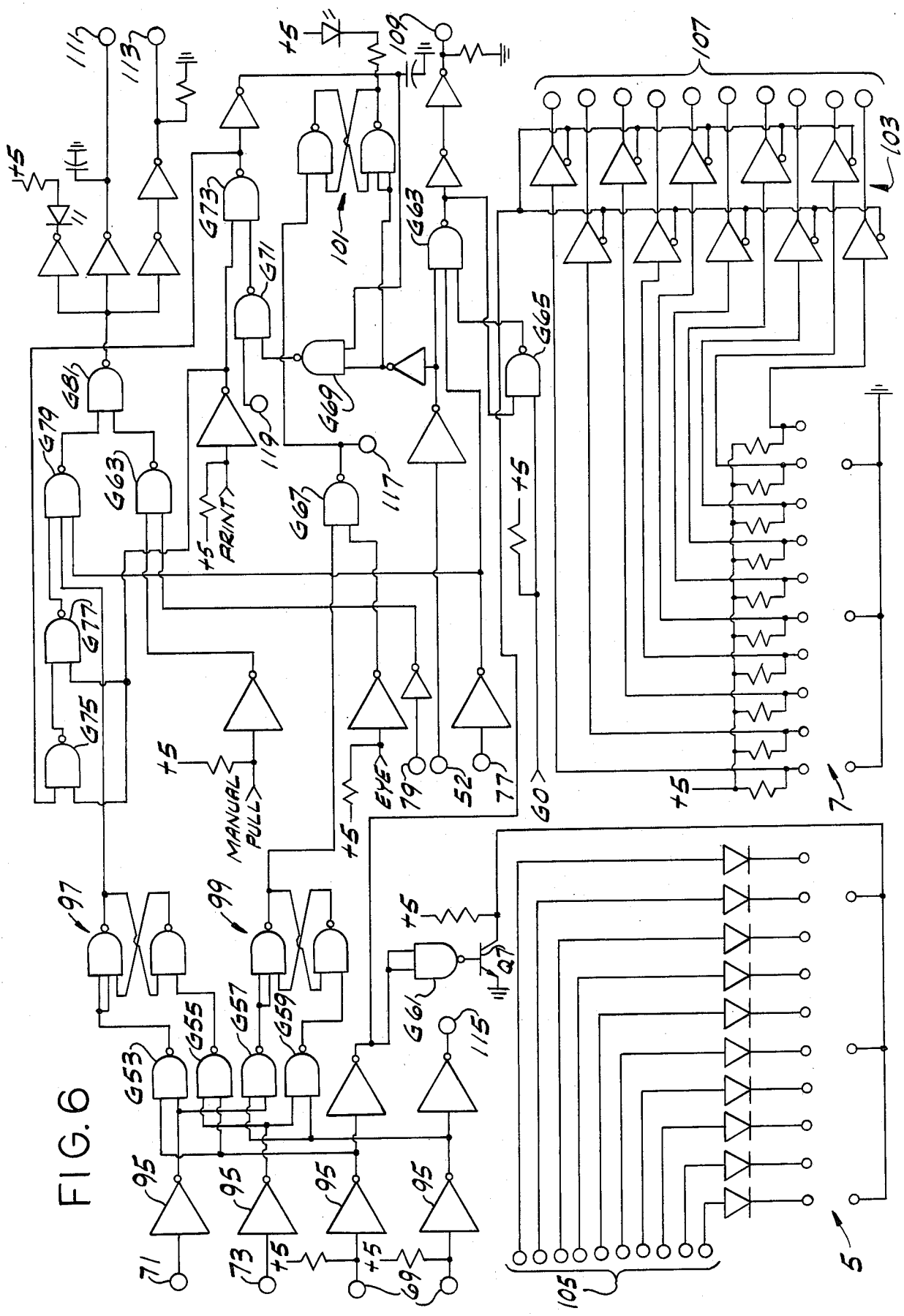
FIG. 6 is an electrical schematic diagram of the feed control circuit of the first embodiment of this invention.

When the multiplexer causes the second from the bottom pin 69 on FIG. 6 to go Low, the output of the associated inverter 95 goes High and this High is supplied to the two NAND gates, gates G53 and G55, which are associated with the pull flip-flop. This High is also reinverted and the resulting Low is supplied to the inputs of gate G61, causing its output to go High and causing transistor Q7 to conduct. This activates pull start switches 5, and the inverted binary coded decimal form of the stage of the machine in degrees at which feeding or pulling of the packaging material is to start is supplied via a plurality of pins 105 and the bus to the comparator section. The Low on this pin 69 also activates buffers 103 which causes the feed or pull stop data from switches 7 to appear via a plurality of pins 107 on the bus. The data from switches 7 is also continuously supplied to the length delay circuit, described below.

The feed control circuit controls three basic components of the system: the encoder clutch, the feed clutch and the feed brake. The encoder clutch is controlled by output pin 109 of the feed control circuit. When this pin goes Low, the pneumatic stop cylinder for this clutch is retracted. This cylinder should only be retracted when three conditions coincide, namely the machine should be between 350 and 359 degrees in its cycle, it should be in the automatic mode, and the go signal should have been received from the product feed or take away systems. A signal representing the first of these three conditions is supplied to the feed control circuit on pin 52 from gate G1 (see FIG. 3A). When the machine is at the proper stage, this signal is Low. This Low is inverted and supplied to one input of NAND gate G63. A signal representing whether the machine is in the automatic mode is supplied via pin 77 (see FIG. 4) to the feed control circuitry. When this signal is Low, the machine is in the automatic mode and a second input of gate G63 is High. The GO signal is supplied through gate G65 to the third input of gate G63. Whenever the GO signal is Low, the output of gate G65 is High. When all the inputs to gate G63 are High, its output is Low. This Low is inverted twice, causing pin 109 to go Low and thereby retracting the pneumatic stop cylinder. The output of gate G63 is also fed back to the input of gate G65, thereby latching its output High. This allows the GO signal to drop and still maintain the encoder clutch in its proper position. When the machine goes from 359 degrees to zero degrees in its cycle, pin 52 goes High. This High is inverted and the resulting Low forces the output of gate G63 High, thereby unlatching gate G65 and, more importantly, causing pin 109 to go High. This cuts off the sinking current of the load and deenergizes the pneumatic stop cylinder. The cylinder extends to its normal position in which it will be engaged by the encoder clutch somewhere between 350 and 359 degrees in the next machine cycle.

To illustrate the features of the feed control circuit, assume that the comparator has determined that the pull or feed of packaging material should begin. When this occurs, pin 71 goes Low. This Low is inverted and the resulting High forces the output of gate G53 Low, since its other input is also High. This Low sets pull flip-flop 97 and its output goes High. This High is supplied to one input of NAND gate G79. If the machine is in the automatic mode, a second input of gate G79 will also be High (because pin 77 will be Low). And if the machine is not in the registered film mode, the input labelled PRINT will be High. This High causes the output of gate G77, which is connected to the third input to gate G79, to be High, which forces the output of gate G79 Low. This Low is supplied to one input of gate G81, causing its output to go High. This High is inverted and the resulting Low, supplied to pin 111, causes the feed clutch to be energized and packging material to be fed through the machine. The output of gate G81 is also supplied to a pair of inverters in series which are connected to a pin 113. When the output of gate G81 is High, pin 113 is High. This pin is connected to the feed brake and when it is High the feed brake is off. The Low output of gate G81 also causes an indicator light to light, thereby displaying the fact that a pull function has been initiated.

The pull or feeding of unregistered material through the machine continues until the comparator determines that the preset feed stop point has been reached. When this occurs, pin 73 goes Low, forcing the output of gate G55 Low. This resets the pull flip-flop, causing its output to go Low. This Low causes the output of gate G79 to go High. Assuming that the machine is not in the manual pull mode, the High output of gate G79 forces the output of gate G81 to go Low. Because of this, pin 111 goes High, which deenergizes the feed clutch, pin 113 goes Low, which energizes the feed brake, thereby stopping the feeding of material through the machine, and the indicator light goes off. In summary, in a plain or unregistered film mode, the clutch follows the action of the pull flip-flop whenever the machine is in the automatic mode and the PRINT switch is off.

In the manual mode, the feed clutch and brake are indirectly controlled by NAND gate G83. Thetwo inputs to this gate are the inverted forms of the signals on pin 79 (signifying that the machine is in the manual mode) and from the MANUAL PULL switch. When both these signals are Low, both inputs to gate G83 are High. This forces its output Low and that forces the output of gate G81 High, thereby energizing the feed clutch and deenergizing the feed brake. Once the MANUAL PULL switch input goes High, the output of gate G83 goes High, the output of gate G81 goes Low, the feed clutch is deenergized and the feed brake is energized. Note that if the machine had been in the automatic mode, the manual pull function would have been disabled since the output of gate G79 would have been Low.

When the machine is in the print or registered film mode, the comparator causes the bottommost pin 69 on FIG. 6 to go Low. This Low is inverted by the associated inverter 95 and the resulting High is supplied to gates G57 (whose output is connected to the set input of the window flip-flop) and G59 (whose output is connected to the reset input). This High is also reinverted and supplied via a pin 115 to the length delay circuit, where it causes a starting point for the window to be computed and supplied to the comparator. Once the machine reaches the starting point of the window, the comparator causes pin 71 to go Low. This Low is inverted and the resulting High forces the output of gate G57 Low, thereby setting window flip-flop 99. The resulting High from flip-flop 99 is supplied to gate G67. The other input to gate G67 is the inverted form of the signal from detector 29, labelled EYE on FIG. 6. When the EYE input goes Low, indicating that a registration mark has been detected, both inputs to gate G67 are High (assuming that the window has not closed). As a result, the output of gate G67 goes Low. This Low is supplied via a pin 117 to the length delay circuit, for a purpose described below, and to the reset input of flip-flop 101. This causes the set output of flip-flop 101 to go Low, thereby lighting an indicator light which indicates that an eyespot was seen in the window for the bag being pulled. Flip-flop 101 is set every cycle by pin 52 going Low during the 350 to 359 degree part of the cycle.

In the print mode, feeding of the packaging material is accomplished as follows: When the machine cycle begins, both inputs of gate G71 (the output of gate G69 and an input 119 from the length delay board) are High and its output is Low. This Low forces the output of gate G73 High. This High is inverted and the resulting Low is supplied to one input of gate G69. The other input to gate G69 goes High as soon as the cycle starts since it directly follows the signal level on pin 52, but this High is inhibited by the Low on the other input. The High output of gate G73 is supplied to one input of gate G75. In the print mode, the other input of this gate is also High since it is connected through an inverter to the PRINT switch. Therefore, the output of gate G75 is Low, which forces the output of gate G77 High. Assuming we are in the automatic mode, all three inputs to gate G79 will be High once the pull flip-flop is set. When this happens, its output goes Low, forcing the output of gate G81 High, thereby energizing the feed clutch and deenergizing the feed brake as described above.

When the EYE input goes Low coincident with the window flip-flop being set, the output of gate G67 goes Low and this Low is supplied to the length delay circuit via pin 117. If this does not occur, indicating that a registration mark was not detected in the window, the feed brake and clutch are controlled by the pull flip-flop and not by the length delay circuit. However, if the registration mark is detected in the window, pin 119 from the length delay circuit will go Low after the preset length delay has occurred. This Low causes the output of gate G71 to go High, which forces the output of gate G72 to go Low. This Low causes the output of gate G75 to go High. As a result the output of gate G77 goes Low, the output of gate G79 goes High and the output of gate G81 goes Low, thereby deenergizing the feed clutch and energizing the feed brake. This means that when an eyespot is detected in the window, the film feed is halted the preset length delay thereafter.

When the output of gate G73 goes High, it also forces the output of gate G69 to go Low and to remain Low until pin 52 goes Low, i.e., until the machine reaches the 350 degree stage in its cycle. This latches the output of gate G71 High even after the signal on pin 119 from the length delay circuitry goes back High. This is required to keep the clutch from turning back on after pin 119 goes High. If the latch circuitry were not employed, the clutch would drop for one degree and then turn back on until the pull flip flop turned it back off.

The length delay circuitry (FIG. 7) includes four memory chips M1, M3, M5, and M7, two comparators 121 and 123, a plurality of output buffers 125, a NAND gate G85, a plurality of inverting buffers 127 directly connected to the feed stop switches for supplying the feed stop information to the length delay circuit, length delay switches 25 whose outputs represent in binary coded decimal form a preset length delay, and a plurality of inverting buffers 129 connecting the length delay switches to the length delay circuit. The concept behind this circuitry is as follows: Because of the nature of packaging material and in particular of packaging film, there is a linear relationship between the length of film fed or pulled through the machine and the number of degrees the encoder covers during the same time. Assume, for example, that one encoder degree equals $\frac{1}{8}''$ of film pull. By way of illustration, assume that the distance between eyespots is twelve inches and that one wants to pull a bag having a repeat length of $\frac{1}{4}''$ greater than that distance, starting the pull at ten degrees. A twelve inch bag would require 12 times 8 or 96 degrees, and the extra $\frac{1}{4}''$ would require an extra two degrees for a total of 98 degrees. Thus, the feed start setting on feed start switches 5 would be 10 degrees and the feed stop setting on feed stop switches 7 would be 108 degrees.

With a fixed eye machine, it is necessary to delay the pull stop by a fixed length delay to achieve a fixed relationship between the detection of the eyespot and the sealing of the package. In addition to the delay, it is necessary to establish a window during which the eye is activated to allow printing between the eyespots and to aid in preventing false triggering due to reflections from the film. Assume that the window is ten degrees wide, corresponding to $1\frac{1}{4}''$ of film pull. Note that this is a length window, not a time window. To move the eyespot with respect to the closure of the sealing jaws, we set a length delay on switches 25. This delay can occur anywhere within the bag length because of variation in the placement of the eyespots and its represents the length of packaging material in degrees fed past the sealing jaws after the detection of an eyespot. This means that the 108 degree pull stop figure represents the absolute stop of the feed mechanism, since if the length delay were started after the point at which it would extend past 108 degrees, the machine would be out of eye control. For a given absolute pull stop point and a given delay, length delay circuit 21 computes the starting and stopping points for the window. The pull stop setting (108 degrees in this example) forms the reference point. The delay value from switches 25 is subtracted from the pull stop setting on switches 7 to determine the window stop value. A constant (e.g., 10 degrees) is subtracted from this computed difference to give the start of the window. This means that for any delay, the starting and stopping points of the window are determined by only two sets of switches, the pull stop switches and the delay switches. And all this computation is done with the four read only memories M1, M3, M5 and M7.

The difference between the least significant decimal digits of the pull stop setting and the delay setting is computed by memory M1, the difference between the tens digits is computed in memory M3, and the difference between the most significant decimal digits is computed in memory M7. Memory M5 subtracts the constant window length from the result from memory M3 to provide the starting point of the window. This computation is all static. The lines representing the binary coded decimal values of the pull stop and delay switches are connected to the address pins of the corresponding memories and the contents of the memory at each address is the decimal difference between the pull stop and delay switch values which address that particular memory location.

For the above example, memories M1 and M3 are programmed according to the following charts 1–20. On these charts, the A1 to A80 data bits refer to the binary coded decimal weights of the pull stop switches. The B1 to B80 lines refer to the binary coded decimal values of the length delay switches. The heading at the top of each chart, e.g., B=60, refers to the decimal value of the delay switch digit being subtracted from the corresponding pull stop switch digit in that particular memory. The contents of the memories are shown inverted in these charts for ease of understanding.

CHART 1:

MEMORY M1,

| ADDRESS | | | | | | | | | |
|---|---|---|---|---|---|---|---|---|---|
| 256 | 1 | 16 | 2 | 32 | 4 | 64 | 8 | 128 | |
| Borrow | $A_1$ | $B_1$ | $A_2$ | $B_2$ | $A_4$ | $B_4$ | $A_8$ | $B_8$ | HEX ADDRESS | CONTENTS |

| Bor-row | $A_1$ | $B_1$ | $A_2$ | $B_2$ | $A_4$ | $B_4$ | $A_8$ | $B_8$ | HEX ADDRESS | CONTENTS |
|---|---|---|---|---|---|---|---|---|---|---|
| 0 | 0 | 0 | 0 | 0 | 0 | 0 | 0 | 0 | 000 | 0 |
| 0 | 1 | 0 | 0 | 0 | 0 | 0 | 0 | 0 | 001 | 1 |
| 0 | 0 | 0 | 1 | 0 | 0 | 0 | 0 | 0 | 002 | 2 |
| 0 | 1 | 0 | 1 | 0 | 0 | 0 | 0 | 0 | 003 | 3 |
| 0 | 0 | 0 | 0 | 0 | 1 | 0 | 0 | 0 | 004 | 4 |
| 0 | 1 | 0 | 0 | 0 | 1 | 0 | 0 | 0 | 005 | 5 |
| 0 | 0 | 0 | 1 | 0 | 1 | 0 | 0 | 0 | 006 | 6 |
| 0 | 1 | 0 | 1 | 0 | 1 | 0 | 0 | 0 | 007 | 7 |
| 0 | 0 | 0 | 0 | 0 | 0 | 0 | 1 | 0 | 008 | 8 |
| 0 | 1 | 0 | 0 | 0 | 0 | 0 | 1 | 0 | 009 | 9 |

B = 0

CHART 2:

MEMORY M1,

| Bor-row | $A_1$ | $B_1$ | $A_2$ | $B_2$ | $A_4$ | $B_4$ | $A_8$ | $B_8$ | HEX ADDRESS | CONTENTS |
|---|---|---|---|---|---|---|---|---|---|---|
| 0 | 0 | 1 | 0 | 0 | 0 | 0 | 0 | 0 | 010 | 9 |
| 0 | 1 | 1 | 0 | 0 | 0 | 0 | 0 | 0 | 011 | 0 |
| 0 | 0 | 1 | 1 | 0 | 0 | 0 | 0 | 0 | 012 | 1 |
| 0 | 1 | 1 | 1 | 0 | 0 | 0 | 0 | 0 | 013 | 2 |
| 0 | 0 | 1 | 0 | 0 | 1 | 0 | 0 | 0 | 014 | 3 |
| 0 | 1 | 1 | 0 | 0 | 1 | 0 | 0 | 0 | 015 | 4 |
| 0 | 0 | 1 | 1 | 0 | 1 | 0 | 0 | 0 | 016 | 5 |
| 0 | 1 | 1 | 1 | 0 | 1 | 0 | 0 | 0 | 017 | 6 |
| 0 | 0 | 1 | 0 | 0 | 0 | 0 | 1 | 0 | 018 | 7 |
| 0 | 1 | 1 | 0 | 0 | 0 | 0 | 1 | 0 | 019 | 8 |

B = 1

CHART 3:

MEMORY M1,

| Bor-row | $A_1$ | $B_1$ | $A_2$ | $B_2$ | $A_4$ | $B_4$ | $A_8$ | $B_8$ | HEX ADDRESS | CONTENTS |
|---|---|---|---|---|---|---|---|---|---|---|
| 0 | 0 | 0 | 0 | 1 | 0 | 0 | 0 | 0 | 020 | 8 |
| 0 | 1 | 0 | 0 | 1 | 0 | 0 | 0 | 0 | 021 | 9 |
| 0 | 0 | 0 | 1 | 1 | 0 | 0 | 0 | 0 | 022 | 0 |
| 0 | 1 | 0 | 1 | 1 | 0 | 0 | 0 | 0 | 023 | 1 |
| 0 | 0 | 0 | 0 | 1 | 1 | 0 | 0 | 0 | 024 | 2 |
| 0 | 1 | 0 | 0 | 1 | 1 | 0 | 0 | 0 | 025 | 3 |
| 0 | 0 | 0 | 1 | 1 | 1 | 0 | 0 | 0 | 026 | 4 |
| 0 | 1 | 0 | 1 | 1 | 1 | 0 | 0 | 0 | 027 | 5 |
| 0 | 0 | 0 | 0 | 1 | 0 | 0 | 1 | 0 | 028 | 6 |
| 0 | 1 | 0 | 0 | 1 | 0 | 0 | 1 | 0 | 029 | 7 |

B = 2

CHART 4:

MEMORY M1,

| Bor-row | $A_1$ | $B_1$ | $A_2$ | $B_2$ | $A_4$ | $B_4$ | $A_8$ | $B_8$ | HEX ADDRESS | CONTENTS |
|---|---|---|---|---|---|---|---|---|---|---|
| 0 | 0 | 1 | 0 | 1 | 0 | 0 | 0 | 0 | 030 | 7 |
| 0 | 1 | 1 | 0 | 1 | 0 | 0 | 0 | 0 | 031 | 8 |
| 0 | 0 | 1 | 1 | 1 | 0 | 0 | 0 | 0 | 032 | 9 |
| 0 | 1 | 1 | 1 | 1 | 0 | 0 | 0 | 0 | 033 | 0 |
| 0 | 0 | 1 | 0 | 1 | 1 | 0 | 0 | 0 | 034 | 1 |
| 0 | 1 | 1 | 0 | 1 | 1 | 0 | 0 | 0 | 035 | 2 |
| 0 | 0 | 1 | 1 | 1 | 1 | 0 | 0 | 0 | 036 | 3 |
| 0 | 1 | 1 | 1 | 1 | 1 | 0 | 0 | 0 | 037 | 4 |
| 0 | 0 | 1 | 0 | 1 | 0 | 0 | 1 | 0 | 038 | 5 |
| 0 | 1 | 1 | 0 | 1 | 0 | 0 | 1 | 0 | 039 | 6 |

B = 3

CHART 5:

MEMORY M1,

| Bor-row | $A_1$ | $B_1$ | $A_2$ | $B_2$ | $A_4$ | $B_4$ | $A_8$ | $B_8$ | HEX ADDRESS | CONTENTS |
|---|---|---|---|---|---|---|---|---|---|---|
| 0 | 0 | 0 | 0 | 0 | 0 | 1 | 0 | 0 | 040 | 6 |
| 0 | 1 | 0 | 0 | 0 | 0 | 1 | 0 | 0 | 041 | 7 |
| 0 | 0 | 0 | 1 | 0 | 0 | 1 | 0 | 0 | 042 | 8 |
| 0 | 1 | 0 | 1 | 0 | 0 | 1 | 0 | 0 | 043 | 9 |
| 0 | 0 | 0 | 0 | 0 | 1 | 1 | 0 | 0 | 044 | 0 |
| 0 | 1 | 0 | 0 | 0 | 1 | 1 | 0 | 0 | 045 | 1 |
| 0 | 0 | 0 | 1 | 0 | 1 | 1 | 0 | 0 | 046 | 2 |
| 0 | 1 | 0 | 1 | 0 | 1 | 1 | 0 | 0 | 047 | 3 |
| 0 | 0 | 0 | 0 | 0 | 0 | 1 | 1 | 0 | 048 | 4 |
| 0 | 1 | 0 | 0 | 0 | 0 | 1 | 1 | 0 | 049 | 5 |

B = 4

CHART 6:

MEMORY M1,

| Bor-row | $A_1$ | $B_1$ | $A_2$ | $B_2$ | $A_4$ | $B_4$ | $A_8$ | $B_8$ | HEX ADDRESS | CONTENTS |
|---|---|---|---|---|---|---|---|---|---|---|
| 0 | 0 | 1 | 0 | 0 | 0 | 1 | 0 | 0 | 050 | 5 |
| 0 | 1 | 1 | 0 | 0 | 0 | 1 | 0 | 0 | 051 | 6 |
| 0 | 0 | 1 | 1 | 0 | 0 | 1 | 0 | 0 | 052 | 7 |
| 0 | 1 | 1 | 1 | 0 | 0 | 1 | 0 | 0 | 053 | 8 |
| 0 | 0 | 1 | 0 | 0 | 1 | 1 | 0 | 0 | 054 | 9 |
| 0 | 1 | 1 | 0 | 0 | 1 | 1 | 0 | 0 | 055 | 0 |
| 0 | 0 | 1 | 1 | 0 | 1 | 1 | 0 | 0 | 056 | 1 |
| 0 | 1 | 1 | 1 | 0 | 1 | 1 | 0 | 0 | 057 | 2 |
| 0 | 0 | 1 | 0 | 0 | 0 | 1 | 1 | 0 | 058 | 3 |
| 0 | 1 | 1 | 0 | 0 | 0 | 1 | 1 | 0 | 059 | 4 |

B = 5

CHART 7:

MEMORY M1,

| Bor-row | $A_1$ | $B_1$ | $A_2$ | $B_2$ | $A_4$ | $B_4$ | $A_8$ | $B_8$ | HEX ADDRESS | CONTENTS |
|---|---|---|---|---|---|---|---|---|---|---|
| 0 | 0 | 0 | 0 | 1 | 0 | 1 | 0 | 0 | 060 | 4 |
| 0 | 1 | 0 | 0 | 1 | 0 | 1 | 0 | 0 | 061 | 5 |
| 0 | 0 | 0 | 1 | 1 | 0 | 1 | 0 | 0 | 062 | 6 |
| 0 | 1 | 0 | 1 | 1 | 0 | 1 | 0 | 0 | 063 | 7 |
| 0 | 0 | 0 | 0 | 1 | 1 | 1 | 0 | 0 | 064 | 8 |
| 0 | 1 | 0 | 0 | 1 | 1 | 1 | 0 | 0 | 065 | 9 |
| 0 | 0 | 0 | 1 | 1 | 1 | 1 | 0 | 0 | 066 | 0 |
| 0 | 1 | 0 | 1 | 1 | 1 | 1 | 0 | 0 | 067 | 1 |
| 0 | 0 | 0 | 0 | 1 | 0 | 1 | 1 | 0 | 068 | 2 |
| 0 | 1 | 0 | 0 | 1 | 0 | 1 | 1 | 0 | 069 | 3 |

B = 6

CHART 8:

| | MEMORY M1, ADDRESS | | | | | | | | | |
|---|---|---|---|---|---|---|---|---|---|---|
| 256 | 1 | 16 | 2 | 32 | 4 | 64 | 8 | 128 | | |
| Bor-row | $A_1$ | $B_1$ | $A_2$ | $B_2$ | $A_4$ | $B_4$ | $A_8$ | $B_8$ | HEX ADDRESS | CON-TENTS |
| 0 | 0 | 1 | 0 | 1 | 0 | 1 | 0 | 0 | 070 | 3 |
| 0 | 1 | 1 | 0 | 1 | 0 | 1 | 0 | 0 | 071 | 4 |
| 0 | 0 | 1 | 1 | 1 | 0 | 1 | 0 | 0 | 072 | 5 |
| 0 | 1 | 1 | 1 | 1 | 0 | 1 | 0 | 0 | 073 | 6 |
| 0 | 0 | 1 | 0 | 1 | 1 | 1 | 0 | 0 | 074 | 7 |
| 0 | 1 | 1 | 0 | 1 | 1 | 1 | 0 | 0 | 075 | 8 |
| 0 | 0 | 1 | 1 | 1 | 1 | 1 | 0 | 0 | 076 | 9 |
| 0 | 1 | 1 | 1 | 1 | 1 | 1 | 0 | 0 | 077 | 0 |
| 0 | 0 | 1 | 0 | 1 | 0 | 1 | 1 | 0 | 070 | 1 |
| 0 | 1 | 1 | 0 | 1 | 0 | 1 | 1 | 0 | 079 | 2 |

B = 6

CHART 9:

| | MEMORY M1, ADDRESS | | | | | | | | | |
|---|---|---|---|---|---|---|---|---|---|---|
| 256 | 1 | 16 | 2 | 32 | 4 | 64 | 8 | 128 | | |
| Bor-row | $A_1$ | $B_1$ | $A_2$ | $B_2$ | $A_4$ | $B_4$ | $A_8$ | $B_8$ | HEX ADDRESS | CON-TENTS |
| 0 | 0 | 0 | 0 | 0 | 0 | 0 | 0 | 1 | 080 | 2 |
| 0 | 1 | 0 | 0 | 0 | 0 | 0 | 0 | 1 | 081 | 3 |
| 0 | 0 | 1 | 0 | 0 | 0 | 0 | 0 | 1 | 082 | 4 |
| 0 | 1 | 0 | 1 | 0 | 0 | 0 | 0 | 1 | 083 | 5 |
| 0 | 0 | 0 | 0 | 0 | 1 | 0 | 0 | 1 | 084 | 6 |
| 0 | 1 | 0 | 0 | 0 | 1 | 0 | 0 | 1 | 085 | 7 |

CHART 9:-continued

| | MEMORY M1, ADDRESS | | | | | | | | | |
|---|---|---|---|---|---|---|---|---|---|---|
| 256 | 1 | 16 | 2 | 32 | 4 | 64 | 8 | 128 | | |
| Bor-row | $A_1$ | $B_1$ | $A_2$ | $B_2$ | $A_4$ | $B_4$ | $A_8$ | $B_8$ | HEX ADDRESS | CON-TENTS |
| 0 | 0 | 0 | 1 | 0 | 1 | 0 | 0 | 1 | 086 | 8 |
| 0 | 1 | 0 | 1 | 0 | 1 | 0 | 0 | 1 | 087 | 9 |
| 0 | 0 | 0 | 0 | 0 | 0 | 0 | 1 | 1 | 080 | 0 |
| 0 | 1 | 0 | 0 | 0 | 0 | 0 | 1 | 1 | 089 | 1 |

B = 8

CHART 10:

| | MEMORY M1, ADDRESS | | | | | | | | | |
|---|---|---|---|---|---|---|---|---|---|---|
| 256 | 1 | 16 | 2 | 32 | 4 | 64 | 8 | 128 | | |
| Bor-row | $A_1$ | $B_1$ | $A_2$ | $B_2$ | $A_4$ | $B_4$ | $A_8$ | $B_8$ | HEX ADDRESS | CON-TENTS |
| 0 | 0 | 1 | 0 | 0 | 0 | 0 | 0 | 1 | 090 | 1 |
| 0 | 1 | 1 | 0 | 0 | 0 | 0 | 0 | 1 | 091 | 2 |
| 0 | 0 | 1 | 1 | 0 | 0 | 0 | 0 | 1 | 092 | 3 |
| 0 | 1 | 1 | 1 | 0 | 0 | 0 | 0 | 1 | 093 | 4 |
| 0 | 0 | 1 | 0 | 0 | 1 | 0 | 0 | 1 | 094 | 5 |
| 0 | 1 | 1 | 0 | 0 | 1 | 0 | 0 | 1 | 095 | 6 |
| 0 | 0 | 1 | 1 | 0 | 1 | 0 | 0 | 1 | 096 | 7 |
| 0 | 1 | 1 | 1 | 0 | 1 | 0 | 0 | 1 | 097 | 8 |
| 0 | 0 | 1 | 0 | 0 | 0 | 0 | 1 | 1 | 098 | 9 |
| 0 | 1 | 1 | 0 | 0 | 0 | 0 | 1 | 1 | 099 | 0 |

B = 0

CHART 11:

| | MEMORY M3, ADDRESS | | | | | | | | | |
|---|---|---|---|---|---|---|---|---|---|---|
| 256 | 1 | 16 | 2 | 32 | 4 | 64 | 8 | 128 | | |
| Bor-row | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 0 | 0 | 0 | 0 | 0 | 0 | 0 | 0 | 0 | 000 | 0 |
| 0 | 1 | 0 | 0 | 0 | 0 | 0 | 0 | 0 | 001 | 1 |
| 0 | 0 | 0 | 1 | 0 | 0 | 0 | 0 | 0 | 002 | 2 |
| 0 | 1 | 0 | 1 | 0 | 0 | 0 | 0 | 0 | 003 | 3 |
| 0 | 0 | 0 | 0 | 0 | 1 | 0 | 0 | 0 | 004 | 4 |
| 0 | 1 | 0 | 0 | 0 | 1 | 0 | 0 | 0 | 005 | 5 |
| 0 | 0 | 0 | 1 | 0 | 1 | 0 | 0 | 0 | 006 | 6 |
| 0 | 1 | 0 | 1 | 0 | 1 | 0 | 0 | 0 | 007 | 7 |
| 0 | 0 | 0 | 0 | 0 | 0 | 0 | 1 | 0 | 008 | 8 |
| 0 | 1 | 0 | 0 | 0 | 0 | 0 | 1 | 0 | 009 | 9 |
| 1 | 0 | 0 | 0 | 0 | 0 | 0 | 0 | 0 | 100 | 9 |
| 1 | 1 | 0 | 0 | 0 | 0 | 0 | 0 | 0 | 101 | 0 |
| 1 | 0 | 0 | 1 | 0 | 0 | 0 | 0 | 0 | 102 | 1 |
| 1 | 1 | 0 | 1 | 0 | 0 | 0 | 0 | 0 | 103 | 2 |
| 1 | 0 | 0 | 0 | 0 | 1 | 0 | 0 | 0 | 104 | 3 |
| 1 | 1 | 0 | 0 | 0 | 1 | 0 | 0 | 0 | 105 | 4 |
| 1 | 0 | 0 | 1 | 0 | 1 | 0 | 0 | 0 | 106 | 5 |
| 1 | 1 | 0 | 1 | 0 | 1 | 0 | 0 | 0 | 107 | 6 |
| 1 | 0 | 0 | 0 | 0 | 0 | 0 | 1 | 0 | 108 | 7 |
| 1 | 1 | 0 | 0 | 0 | 0 | 0 | 1 | 0 | 109 | 8 |

B = 0

CHART 12:

| | MEMORY M3, ADDRESS | | | | | | | | | |
|---|---|---|---|---|---|---|---|---|---|---|
| 256 | 1 | 16 | 2 | 32 | 4 | 64 | 8 | 128 | | |
| Bor-row | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 0 | 0 | 1 | 0 | 0 | 0 | 0 | 0 | 0 | 010 | 9 |
| 0 | 1 | 1 | 0 | 0 | 0 | 0 | 0 | 0 | 011 | 0 |
| 0 | 0 | 1 | 1 | 0 | 0 | 0 | 0 | 0 | 012 | 1 |
| 0 | 1 | 1 | 1 | 0 | 0 | 0 | 0 | 0 | 013 | 2 |
| 0 | 0 | 1 | 0 | 0 | 1 | 0 | 0 | 0 | 014 | 3 |
| 0 | 1 | 1 | 0 | 0 | 1 | 0 | 0 | 0 | 015 | 4 |
| 0 | 0 | 1 | 1 | 0 | 1 | 0 | 0 | 0 | 016 | 5 |
| 0 | 1 | 1 | 1 | 0 | 1 | 0 | 0 | 0 | 017 | 6 |
| 0 | 0 | 1 | 0 | 0 | 0 | 0 | 1 | 0 | 018 | 7 |
| 0 | 1 | 1 | 0 | 0 | 0 | 0 | 1 | 0 | 019 | 8 |

CHART 12:-continued

MEMORY M3,

| ADDRESS | | | | | | | | | | |
|---|---|---|---|---|---|---|---|---|---|---|
| 256 | 1 | 16 | 2 | 32 | 4 | 64 | 8 | 128 | | |
| Borrow | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 1 | 0 | 1 | 0 | 0 | 0 | 0 | 0 | 0 | 110 | 8 |
| 1 | 1 | 1 | 0 | 0 | 0 | 0 | 0 | 0 | 111 | 9 |
| 1 | 0 | 1 | 1 | 0 | 0 | 0 | 0 | 0 | 112 | 0 |
| 1 | 1 | 1 | 1 | 0 | 0 | 0 | 0 | 0 | 113 | 1 |
| 1 | 0 | 1 | 0 | 0 | 1 | 0 | 0 | 0 | 114 | 2 |
| 1 | 1 | 1 | 0 | 0 | 1 | 0 | 0 | 0 | 115 | 3 |
| 1 | 0 | 1 | 1 | 0 | 1 | 0 | 0 | 0 | 116 | 4 |
| 1 | 1 | 1 | 1 | 0 | 1 | 0 | 0 | 0 | 117 | 5 |
| 1 | 0 | 1 | 0 | 0 | 0 | 0 | 1 | 0 | 118 | 6 |
| 1 | 1 | 1 | 0 | 0 | 0 | 0 | 1 | 0 | 119 | 7 |

B = 10

CHART 13:

MEMORY M3,

| ADDRESS | | | | | | | | | | |
|---|---|---|---|---|---|---|---|---|---|---|
| 256 | 1 | 16 | 2 | 32 | 4 | 64 | 8 | 128 | | |
| Borrow | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 0 | 0 | 0 | 0 | 0 | 1 | 0 | 0 | 0 | 020 | 8 |
| 0 | 1 | 0 | 0 | 0 | 1 | 0 | 0 | 0 | 021 | 9 |
| 0 | 0 | 0 | 1 | 0 | 1 | 0 | 0 | 0 | 022 | 0 |
| 0 | 1 | 0 | 1 | 0 | 1 | 0 | 0 | 0 | 023 | 1 |
| 0 | 0 | 0 | 0 | 1 | 1 | 0 | 0 | 0 | 024 | 2 |
| 0 | 1 | 0 | 0 | 1 | 1 | 0 | 0 | 0 | 025 | 3 |
| 0 | 0 | 0 | 1 | 1 | 1 | 0 | 0 | 0 | 026 | 4 |
| 0 | 1 | 0 | 1 | 1 | 1 | 0 | 0 | 0 | 027 | 5 |
| 0 | 0 | 0 | 0 | 1 | 0 | 0 | 1 | 0 | 028 | 6 |
| 0 | 1 | 0 | 0 | 1 | 0 | 0 | 1 | 0 | 029 | 7 |
| 1 | 0 | 0 | 0 | 1 | 0 | 0 | 0 | 0 | 120 | 7 |
| 1 | 1 | 0 | 0 | 1 | 0 | 0 | 0 | 0 | 121 | 8 |
| 1 | 0 | 0 | 1 | 1 | 0 | 0 | 0 | 0 | 122 | 9 |
| 1 | 1 | 0 | 1 | 1 | 0 | 0 | 0 | 0 | 123 | 0 |
| 1 | 0 | 0 | 0 | 1 | 1 | 0 | 0 | 0 | 124 | 1 |
| 1 | 1 | 0 | 0 | 1 | 1 | 0 | 0 | 0 | 125 | 2 |
| 1 | 0 | 0 | 1 | 1 | 1 | 0 | 0 | 0 | 126 | 3 |
| 1 | 1 | 0 | 1 | 1 | 1 | 0 | 0 | 0 | 127 | 4 |
| 1 | 0 | 0 | 0 | 1 | 0 | 0 | 1 | 0 | 128 | 5 |
| 1 | 1 | 0 | 0 | 1 | 0 | 0 | 1 | 0 | 129 | 6 |

B = 20

CHART 14:

MEMORY M3,

| ADDRESS | | | | | | | | | | |
|---|---|---|---|---|---|---|---|---|---|---|
| 256 | 1 | 16 | 2 | 32 | 4 | 64 | 8 | 128 | | |
| Borrow | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 0 | 0 | 1 | 0 | 1 | 0 | 0 | 0 | 0 | 030 | 7 |
| 0 | 1 | 1 | 0 | 1 | 0 | 0 | 0 | 0 | 031 | 8 |
| 0 | 0 | 1 | 1 | 1 | 0 | 0 | 0 | 0 | 032 | 9 |
| 0 | 1 | 1 | 1 | 1 | 0 | 0 | 0 | 0 | 033 | 0 |
| 0 | 0 | 1 | 0 | 1 | 1 | 0 | 0 | 0 | 034 | 1 |
| 0 | 1 | 1 | 0 | 1 | 1 | 0 | 0 | 0 | 035 | 2 |
| 0 | 0 | 1 | 1 | 1 | 1 | 0 | 0 | 0 | 036 | 3 |
| 0 | 1 | 1 | 1 | 1 | 1 | 0 | 0 | 0 | 037 | 4 |
| 0 | 0 | 1 | 0 | 1 | 0 | 0 | 1 | 0 | 038 | 5 |
| 0 | 1 | 1 | 0 | 1 | 0 | 0 | 1 | 0 | 039 | 6 |
| 1 | 0 | 1 | 0 | 1 | 0 | 0 | 0 | 0 | 130 | 6 |
| 1 | 1 | 1 | 0 | 1 | 0 | 0 | 0 | 0 | 131 | 7 |
| 1 | 0 | 1 | 1 | 1 | 0 | 0 | 0 | 0 | 132 | 8 |
| 1 | 1 | 1 | 1 | 1 | 0 | 0 | 0 | 0 | 133 | 9 |
| 1 | 0 | 1 | 0 | 1 | 1 | 0 | 0 | 0 | 134 | 0 |
| 1 | 1 | 1 | 0 | 1 | 1 | 0 | 0 | 0 | 135 | 1 |
| 1 | 0 | 1 | 1 | 1 | 1 | 0 | 0 | 0 | 136 | 2 |
| 1 | 1 | 1 | 1 | 1 | 1 | 0 | 0 | 0 | 137 | 3 |
| 1 | 0 | 1 | 0 | 1 | 0 | 0 | 1 | 0 | 138 | 4 |
| 1 | 1 | 1 | 0 | 1 | 0 | 0 | 1 | 0 | 139 | 5 |

B = 30

CHART 15:

| | | | | ADDRESS | | | | | | |
|---|---|---|---|---|---|---|---|---|---|---|
| 256 | 1 | 16 | 2 | 32 | 4 | 64 | 8 | 128 | | |
| Bor-row | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 0 | 0 | 0 | 0 | 0 | 0 | 1 | 0 | 0 | 040 | 6 |
| 0 | 1 | 0 | 0 | 0 | 0 | 1 | 0 | 0 | 041 | 7 |
| 0 | 0 | 0 | 1 | 0 | 0 | 1 | 0 | 0 | 042 | 8 |
| 0 | 1 | 0 | 1 | 0 | 0 | 1 | 0 | 0 | 043 | 9 |
| 0 | 0 | 0 | 0 | 0 | 1 | 1 | 0 | 0 | 044 | 0 |
| 0 | 1 | 0 | 0 | 0 | 1 | 1 | 0 | 0 | 045 | 1 |
| 0 | 0 | 0 | 1 | 0 | 1 | 1 | 0 | 0 | 046 | 2 |
| 0 | 1 | 0 | 1 | 0 | 1 | 1 | 0 | 0 | 047 | 3 |
| 0 | 0 | 0 | 0 | 0 | 0 | 1 | 1 | 0 | 048 | 4 |
| 0 | 1 | 0 | 0 | 0 | 0 | 1 | 1 | 0 | 049 | 5 |
| 1 | 0 | 0 | 0 | 0 | 0 | 1 | 0 | 0 | 140 | 5 |
| 1 | 1 | 0 | 0 | 0 | 0 | 1 | 0 | 0 | 141 | 6 |
| 1 | 0 | 0 | 1 | 0 | 0 | 1 | 0 | 0 | 142 | 7 |
| 1 | 1 | 0 | 1 | 0 | 0 | 1 | 0 | 0 | 143 | 8 |
| 1 | 0 | 0 | 0 | 0 | 1 | 1 | 0 | 0 | 144 | 9 |
| 1 | 1 | 0 | 0 | 0 | 1 | 1 | 0 | 0 | 145 | 0 |
| 1 | 0 | 0 | 1 | 0 | 1 | 1 | 0 | 0 | 146 | 1 |
| 1 | 1 | 0 | 1 | 0 | 1 | 1 | 0 | 0 | 147 | 2 |
| 1 | 0 | 0 | 0 | 0 | 0 | 1 | 1 | 0 | 148 | 3 |
| 1 | 1 | 0 | 0 | 0 | 0 | 1 | 1 | 0 | 149 | 4 |

B = 40

CHART 16:

| | | | | ADDRESS | | | | | | |
|---|---|---|---|---|---|---|---|---|---|---|
| 256 | 1 | 16 | 2 | 32 | 4 | 64 | 8 | 128 | | |
| Bor-row | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 0 | 0 | 1 | 0 | 0 | 0 | 1 | 0 | 0 | 050 | 5 |
| 0 | 1 | 1 | 0 | 0 | 0 | 1 | 0 | 0 | 051 | 6 |
| 0 | 0 | 1 | 1 | 0 | 0 | 1 | 0 | 0 | 052 | 7 |
| 0 | 1 | 1 | 1 | 0 | 0 | 1 | 0 | 0 | 053 | 8 |
| 0 | 0 | 1 | 0 | 0 | 1 | 1 | 0 | 0 | 054 | 9 |
| 0 | 1 | 1 | 0 | 0 | 1 | 1 | 0 | 0 | 055 | 0 |
| 0 | 0 | 1 | 1 | 0 | 1 | 1 | 0 | 0 | 056 | 1 |
| 0 | 1 | 1 | 1 | 0 | 1 | 1 | 0 | 0 | 057 | 2 |
| 0 | 0 | 1 | 0 | 0 | 0 | 1 | 1 | 0 | 058 | 3 |
| 0 | 1 | 1 | 0 | 0 | 0 | 1 | 1 | 0 | 059 | 4 |
| 1 | 0 | 1 | 0 | 0 | 0 | 1 | 0 | 0 | 150 | 4 |
| 1 | 1 | 1 | 0 | 0 | 0 | 1 | 0 | 0 | 151 | 5 |
| 1 | 0 | 1 | 1 | 0 | 0 | 1 | 0 | 0 | 152 | 6 |
| 1 | 1 | 1 | 1 | 0 | 0 | 1 | 0 | 0 | 153 | 7 |
| 1 | 0 | 1 | 0 | 0 | 1 | 1 | 0 | 0 | 154 | 8 |
| 1 | 1 | 1 | 0 | 0 | 1 | 1 | 0 | 0 | 155 | 9 |
| 1 | 0 | 1 | 1 | 0 | 1 | 1 | 0 | 0 | 156 | 0 |
| 1 | 1 | 1 | 1 | 0 | 1 | 1 | 0 | 0 | 157 | 1 |
| 1 | 0 | 1 | 0 | 0 | 0 | 1 | 1 | 0 | 158 | 2 |
| 1 | 1 | 1 | 0 | 0 | 0 | 1 | 1 | 0 | 159 | 3 |

B = 50

CHART 17:

| | | | | ADDRESS | | | | | | |
|---|---|---|---|---|---|---|---|---|---|---|
| 256 | 1 | 16 | 2 | 32 | 4 | 64 | 8 | 128 | | |
| Bor-row | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 0 | 0 | 0 | 0 | 1 | 0 | 1 | 0 | 0 | 060 | 4 |
| 0 | 1 | 0 | 0 | 1 | 0 | 1 | 0 | 0 | 061 | 5 |
| 0 | 0 | 0 | 1 | 1 | 0 | 1 | 0 | 0 | 062 | 6 |
| 0 | 1 | 0 | 1 | 1 | 0 | 1 | 0 | 0 | 063 | 7 |
| 0 | 0 | 0 | 0 | 1 | 1 | 1 | 0 | 0 | 064 | 8 |
| 0 | 1 | 0 | 0 | 1 | 1 | 1 | 0 | 0 | 065 | 9 |
| 0 | 0 | 0 | 1 | 1 | 1 | 1 | 0 | 0 | 066 | 0 |
| 0 | 1 | 0 | 1 | 1 | 1 | 1 | 0 | 0 | 067 | 1 |
| 0 | 0 | 0 | 0 | 1 | 0 | 1 | 1 | 0 | 068 | 2 |
| 0 | 1 | 0 | 0 | 1 | 0 | 1 | 1 | 0 | 069 | 3 |
| 1 | 0 | 0 | 0 | 1 | 0 | 1 | 0 | 0 | 160 | 3 |
| 1 | 1 | 0 | 0 | 1 | 0 | 1 | 0 | 0 | 161 | 4 |
| 1 | 0 | 0 | 1 | 1 | 0 | 1 | 0 | 0 | 162 | 5 |
| 1 | 1 | 0 | 1 | 1 | 0 | 1 | 0 | 0 | 163 | 6 |
| 1 | 0 | 0 | 0 | 1 | 1 | 1 | 0 | 0 | 164 | 7 |

CHART 17:-continued

MEMORY M3,

| ADDRESS | | | | | | | | | | |
|---|---|---|---|---|---|---|---|---|---|---|
| 256 | 1 | 16 | 2 | 32 | 4 | 64 | 8 | 128 | | |
| Borrow | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 1 | 1 | 0 | 0 | 1 | 1 | 1 | 0 | 0 | 165 | 8 |
| 1 | 0 | 0 | 1 | 1 | 1 | 1 | 0 | 0 | 166 | 9 |
| 1 | 1 | 0 | 1 | 1 | 1 | 1 | 0 | 0 | 167 | 0 |
| 1 | 0 | 0 | 0 | 1 | 0 | 1 | 1 | 0 | 168 | 1 |
| 1 | 1 | 0 | 0 | 1 | 0 | 1 | 1 | 0 | 169 | 2 |

B = 60

CHART 18:

MEMORY M3,

| ADDRESS | | | | | | | | | | |
|---|---|---|---|---|---|---|---|---|---|---|
| 256 | 1 | 16 | 2 | 32 | 4 | 64 | 8 | 128 | | |
| Borrow | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 0 | 0 | 1 | 0 | 1 | 0 | 1 | 0 | 0 | 070 | 3 |
| 0 | 1 | 1 | 0 | 1 | 0 | 1 | 0 | 0 | 071 | 4 |
| 0 | 0 | 1 | 1 | 1 | 0 | 1 | 0 | 0 | 072 | 5 |
| 0 | 1 | 1 | 1 | 1 | 0 | 1 | 0 | 0 | 073 | 6 |
| 0 | 0 | 1 | 0 | 1 | 1 | 1 | 0 | 0 | 074 | 7 |
| 0 | 1 | 1 | 0 | 1 | 1 | 1 | 0 | 0 | 075 | 8 |
| 0 | 0 | 1 | 1 | 1 | 1 | 1 | 0 | 0 | 076 | 9 |
| 0 | 1 | 1 | 1 | 1 | 1 | 1 | 0 | 0 | 077 | 0 |
| 0 | 0 | 1 | 0 | 1 | 0 | 1 | 1 | 0 | 078 | 1 |
| 0 | 1 | 1 | 0 | 1 | 0 | 1 | 1 | 0 | 079 | 2 |
| 1 | 0 | 1 | 0 | 1 | 0 | 1 | 0 | 0 | 170 | 2 |
| 1 | 1 | 1 | 0 | 1 | 0 | 1 | 0 | 0 | 171 | 3 |
| 1 | 0 | 1 | 1 | 1 | 0 | 1 | 0 | 0 | 172 | 4 |
| 1 | 1 | 1 | 1 | 1 | 0 | 1 | 0 | 0 | 173 | 5 |
| 1 | 0 | 1 | 0 | 1 | 1 | 1 | 0 | 0 | 174 | 6 |
| 1 | 1 | 1 | 0 | 1 | 1 | 1 | 0 | 0 | 175 | 7 |
| 1 | 0 | 1 | 1 | 1 | 1 | 1 | 0 | 0 | 176 | 8 |
| 1 | 1 | 1 | 1 | 1 | 1 | 1 | 0 | 0 | 177 | 9 |
| 1 | 0 | 1 | 0 | 1 | 0 | 1 | 1 | 0 | 178 | 0 |
| 1 | 1 | 1 | 0 | 1 | 0 | 1 | 1 | 0 | 179 | 1 |

B = 70

CHART 19:

MEMORY M3,

| ADDRESS | | | | | | | | | | |
|---|---|---|---|---|---|---|---|---|---|---|
| 256 | 1 | 16 | 2 | 32 | 4 | 64 | 8 | 128 | | |
| Borrow | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 0 | 0 | 0 | 0 | 0 | 0 | 0 | 0 | 1 | 080 | 2 |
| 0 | 1 | 0 | 0 | 0 | 0 | 0 | 0 | 1 | 081 | 3 |
| 0 | 0 | 0 | 1 | 0 | 0 | 0 | 0 | 1 | 082 | 4 |
| 0 | 1 | 0 | 1 | 0 | 0 | 0 | 0 | 1 | 083 | 5 |
| 0 | 0 | 0 | 0 | 0 | 1 | 0 | 0 | 1 | 084 | 6 |
| 0 | 1 | 0 | 0 | 0 | 1 | 0 | 0 | 1 | 085 | 7 |
| 0 | 0 | 0 | 1 | 0 | 1 | 0 | 0 | 1 | 086 | 8 |
| 0 | 1 | 0 | 1 | 0 | 1 | 0 | 0 | 1 | 087 | 9 |
| 0 | 0 | 0 | 0 | 0 | 0 | 0 | 1 | 1 | 088 | 0 |
| 0 | 1 | 0 | 0 | 0 | 0 | 0 | 1 | 1 | 089 | 1 |
| 1 | 0 | 0 | 0 | 0 | 0 | 0 | 0 | 1 | 180 | 1 |
| 1 | 1 | 0 | 0 | 0 | 0 | 0 | 0 | 1 | 181 | 2 |
| 1 | 0 | 0 | 1 | 0 | 0 | 0 | 0 | 1 | 182 | 3 |
| 1 | 1 | 0 | 1 | 0 | 0 | 0 | 0 | 1 | 183 | 4 |
| 1 | 0 | 0 | 0 | 0 | 1 | 0 | 0 | 1 | 184 | 5 |
| 1 | 1 | 0 | 0 | 0 | 1 | 0 | 0 | 1 | 185 | 6 |
| 1 | 0 | 0 | 1 | 0 | 1 | 0 | 0 | 1 | 186 | 7 |
| 1 | 1 | 0 | 1 | 0 | 1 | 0 | 0 | 1 | 187 | 8 |
| 1 | 0 | 0 | 0 | 0 | 0 | 0 | 1 | 1 | 188 | 9 |
| 1 | 1 | 0 | 0 | 0 | 0 | 0 | 1 | 1 | 189 | 0 |

B = 80

CHART 20:

MEMORY M3,

| | | | | ADDRESS | | | | | | |
|---|---|---|---|---|---|---|---|---|---|---|
| 256 | 1 | 16 | 2 | 32 | 4 | 64 | 8 | 128 | | |
| Borrow | $A_{10}$ | $B_{10}$ | $A_{20}$ | $B_{20}$ | $A_{40}$ | $B_{40}$ | $A_{80}$ | $B_{80}$ | HEX ADDRESS | CONTENTS |
| 0 | 0 | 1 | 0 | 0 | 0 | 0 | 0 | 1 | 090 | 1 |
| 0 | 1 | 1 | 0 | 0 | 0 | 0 | 0 | 1 | 091 | 2 |
| 0 | 0 | 1 | 1 | 0 | 0 | 0 | 0 | 1 | 092 | 3 |
| 0 | 1 | 1 | 1 | 0 | 0 | 0 | 0 | 1 | 093 | 4 |
| 0 | 0 | 1 | 0 | 0 | 1 | 0 | 0 | 1 | 094 | 5 |
| 0 | 1 | 1 | 0 | 0 | 1 | 0 | 0 | 1 | 095 | 6 |
| 0 | 0 | 1 | 1 | 0 | 1 | 0 | 0 | 1 | 096 | 7 |
| 0 | 1 | 1 | 1 | 0 | 1 | 0 | 0 | 1 | 097 | 8 |
| 0 | 0 | 1 | 0 | 0 | 0 | 0 | 1 | 1 | 098 | 9 |
| 0 | 1 | 1 | 0 | 0 | 0 | 0 | 1 | 1 | 099 | 0 |
| 1 | 0 | 1 | 0 | 0 | 0 | 0 | 0 | 1 | 190 | 0 |
| 1 | 1 | 1 | 0 | 0 | 0 | 0 | 0 | 1 | 191 | 1 |
| 1 | 0 | 1 | 1 | 0 | 0 | 0 | 0 | 1 | 192 | 2 |
| 1 | 1 | 1 | 1 | 0 | 0 | 0 | 0 | 1 | 193 | 3 |
| 1 | 0 | 1 | 0 | 0 | 1 | 0 | 0 | 1 | 194 | 4 |
| 1 | 1 | 1 | 0 | 0 | 1 | 0 | 0 | 1 | 195 | 5 |
| 1 | 0 | 1 | 1 | 0 | 1 | 0 | 0 | 1 | 196 | 6 |
| 1 | 1 | 1 | 1 | 0 | 1 | 0 | 0 | 1 | 197 | 7 |
| 1 | 0 | 1 | 0 | 0 | 0 | 0 | 1 | 1 | 198 | 8 |
| 1 | 1 | 1 | 0 | 0 | 0 | 0 | 1 | 1 | 199 | 9 |

B = 90

The results of the subtraction of the tens digits in memory M3 is supplied to the address lines of memory M5, wherein 10 (or some other appropriate constant) is subtracted therefrom. This memory is programmed according to chart 21. Only that part of the memory corresponding to a window width of ten is shown. In this chart the contents are not inverted, so 1101 represents 20 (decimal), not 130.

CHART 21:

MEMORY M5, OUTPUT OF MEMORY M3-10

| | ADDRESS | | | | |
|---|---|---|---|---|---|
| 8 LSD | 1 LSD+1 | 2 MSD−1 | 4 MSD | HEX ADDRESS | CONTENTS |
| 1 | 1 | 1 | 1 | 01F | 6 |
| 0 | 1 | 1 | 1 | 017 | F |
| 1 | 0 | 1 | 1 | 01E | E |
| 0 | 0 | 1 | 1 | 016 | D |
| 1 | 1 | 0 | 1 | 01D | C |
| 0 | 1 | 0 | 1 | 015 | B |

CHART 21:-continued

MEMORY M5, OUTPUT OF MEMORY M3-10

| | ADDRESS | | | | |
|---|---|---|---|---|---|
| 8 LSD | 1 LSD+1 | 2 MSD−1 | 4 MSD | HEX ADDRESS | CONTENTS |
| 1 | 0 | 0 | 1 | 01C | A |
| 0 | 0 | 0 | 1 | 014 | 9 |
| 1 | 1 | 1 | 0 | 01B | 8 |
| 0 | 1 | 1 | 0 | 013 | 7 |

The subtraction of the most significant digits of the pull stop and delay switches is done by memory M7, the programming chart for which is chart 22. Like memories M1 and M3, the relevant data lines, in this case the $A_{100}$, $A_{200}$, $B_{100}$ and $B_{200}$ lines, are connected directly to the address pins of the memory. There are two other inputs, explained below, that must be used to address the correct result in this memory. Like chart 21, the data in chart 22 is not inverted.

CHART 22:

MEMORY M7

| ADDRESS | | | | | | CONTENTS | | | | | |
|---|---|---|---|---|---|---|---|---|---|---|---|
| 32 | 16 | 2 | 8 | 4 | 1 | WINDOW STOP | | WINDOW START | | | |
| M3 | Borrow | $A_{100}$ | $B_{100}$ | $A_{200}$ | $B_{200}$ | 100 | 200 | 100 | 200 | HEX ADDRESS | CONTENTS |
| 0 | 0 | 0 | 0 | 0 | 0 | 1 | 1 | 1 | 1 | 000 | F |
| 0 | 0 | 1 | 0 | 0 | 0 | 0 | 1 | 0 | 1 | 002 | 5 |
| 0 | 1 | 1 | 0 | 0 | 0 | 1 | 1 | 1 | 1 | 012 | F |
| 0 | 0 | 0 | 0 | 1 | 0 | 1 | 0 | 1 | 0 | 004 | A |
| 0 | 0 | 0 | 0 | 1 | 1 | 1 | 1 | 1 | 1 | 005 | F |
| 0 | 1 | 0 | 0 | 1 | 0 | 0 | 1 | 0 | 1 | 014 | 5 |
| 0 | 0 | 1 | 0 | 1 | 0 | 0 | 0 | 0 | 0 | 006 | 0 |
| 0 | 0 | 1 | 0 | 1 | 1 | 1 | 0 | 1 | 0 | 007 | A |
| 0 | 1 | 1 | 0 | 1 | 0 | 1 | 0 | 1 | 0 | 016 | A |
| 0 | 1 | 1 | 0 | 1 | 1 | 1 | 1 | 1 | 1 | 017 | F |
| 0 | 0 | 1 | 0 | 1 | 0 | 1 | 1 | 1 | 1 | 00A | F |
| 0 | 0 | 0 | 1 | 1 | 0 | 1 | 0 | 1 | 0 | 00C | A |
| 0 | 1 | 0 | 1 | 1 | 0 | 1 | 1 | 1 | 1 | 01C | F |
| 0 | 0 | 0 | 1 | 1 | 1 | 0 | 1 | 0 | 1 | 00E | 5 |
| 0 | 0 | 1 | 1 | 1 | 1 | 1 | 1 | 1 | 1 | 00F | 5 |
| 0 | 1 | 1 | 1 | 1 | 0 | 1 | 0 | 1 | 0 | 01E | 5 |
| 1 | 0 | 1 | 0 | 0 | 0 | 0 | 1 | 1 | 1 | 022 | 7 |
| 1 | 0 | 0 | 0 | 1 | 0 | 1 | 0 | 0 | 1 | 024 | 9 |
| 1 | 1 | 0 | 0 | 1 | 0 | 0 | 1 | 1 | 1 | 034 | 7 |
| 1 | 0 | 1 | 0 | 1 | 0 | 0 | 0 | 1 | 0 | 026 | 2 |
| 1 | 0 | 1 | 0 | 1 | 1 | 1 | 0 | 0 | 1 | 027 | 9 |

CHART 22:-continued

| ADDRESS | | | | | | MEMORY M7 | | | | | |
|---|---|---|---|---|---|---|---|---|---|---|---|
| 32 | 16 | 2 | 8 | 4 | 1 | \multicolumn{4}{c}{CONTENTS} | | | |
| | Bor- | | | | | WINDOW STOP | | WINDOW START | | | |
| M3 | row | A$_{100}$ | B$_{100}$ | A$_{200}$ | B$_{200}$ | 100 | 200 | 100 | 200 | HEX ADDRESS | CONTENTS |
| 1 | 1 | 1 | 0 | 1 | 0 | 1 | 0 | 0 | 1 | 036 | 9 |
| 1 | 0 | 1 | 1 | 1 | 0 | 1 | 0 | 0 | 1 | 02E | 9 |
| 1 | 1 | 1 | 1 | 1 | 0 | 0 | 1 | 1 | 1 | 03E | 7 |

Figure 8:
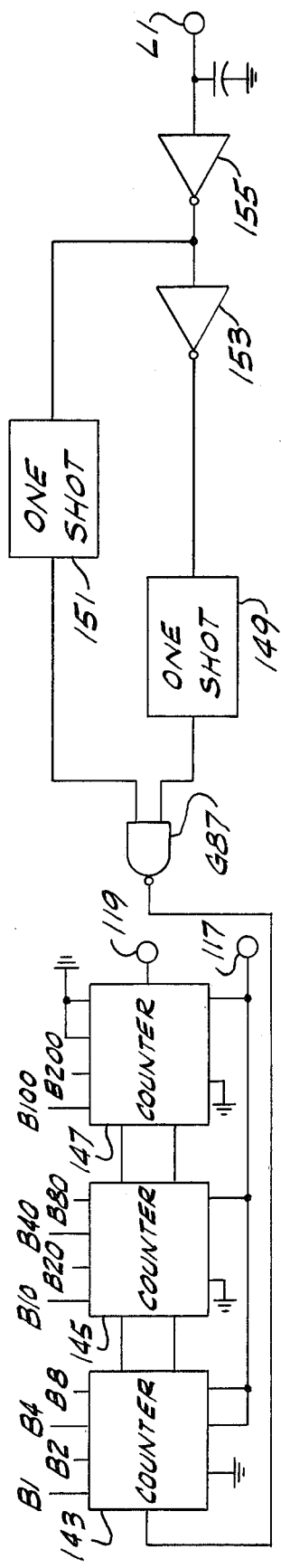
FIG. 8 is an electrical schematic of a portion of the length delay circuit of the first embodiment of this invention.

Referring back to FIG. 7, the labels B1, B2, B4, B8, etc. refer to the binary coded decimal weights of the length delay switches and represent appropriate connections between those switches and the rest of the circuitry on FIGS. 7 & 8, while the labels A1, A2, A4, etc. refer to the binary coded decimal weights of the pull stop switches and again represent appropriate connections. As mentioned above, these connections include connections to the address pins of memories M1, M3 and M7. Lines A1–A80 and B1–B80 are also connected to the inputs of comparators 121 and 123. The purpose of this is to provide for the situation in which the ones or the tens digit, or both, of the delay value exceeds the corresponding pull stop digit. When the ones digit of the delay switches exceeds the ones digit of the pull stop switches, as for example when the pull stop value is 123 and the delay is 95, comparator 21 generates a borrow signal (High) on pin 2 and supplies this to comparator 123 for subsequent calculation in the tens decade. This High is also supplied to an address pin of memory M3. This signal is shown in the column entitled "Borrow" in charts 11–20. Likewise, if a borrow is required in the tens place, comparator 123 supplies a High to memory M7. This signal is shown in the column entitled "Borrow" in chart 22. There is one other address input to memory M7, and the need for such arises when the subtraction in the tens place results in a zero. When this occurs, the output of memory M5 is 90 (decimal) and if the hundreds digit (the output of memory M7) is not reduced by one for the start of the window the output will be incorrect. To obtain this input, the outputs of memory M3 are all connected to the inputs of gate G85. If and only if all these inputs are High, indicating a zero difference in the tens place, the output of gate G85 will be Low. This Low is inverted and supplied to an address pin of memory M7. This signal is shown in the column entitled M3 on chart 22.

For example, assume that the pull stop value is 108 degrees and the required delay is 29 degrees. In this case, A100, A8, B20, B8 and B1 are all High and the rest of the pull stop and delay switch inputs are Low. When the multiplexer enables the memories and buffers on FIG. 7 by causing the corresponding pin 69 to go Low, the computation of the window is performed. Referring to chart 10, the output of memory M1 under these conditions is an inverted 9 in binary form. This output is supplied via buffers 125 to output pins 131, where it and represents the ones digit of the starting point of the window, and to output pins 133 where it represents the ones digit to the stopping point of the window. Since the ones digit of the delay figure is greater than the ones digit of the stopping point figure, pin 2 of comparator 121 goes High. Thus, in examining chart 13 for the result of the tens subtraction, one must look at the bottom part of the chart where Borrow=1. From this chart, the contents of the addressed memory location is the inverted binary form of 7. This inverted binary number is the output of memory M3 and is supplied to the address pins of memory M5 and to output pins 135 where it represents the tens digit of the stopping point of the window. From chart 21, the output of memory M5 for this input is the inverted binary form of 6, which represents the tens digit of the starting point of the window. This output is supplied to the comparator section via output pins 137. Since the tens digit of the pull stop switches was less than that of the delay switches, pin 2 of comparator 123 is High and on chart 22 one must look at lines in which Borrow=1. In addition the output of memory M3 was not zero (decimal), so the entry in that column for this example is zero. From chart 22, the contents of memory M7 at this location is the inverted binary form of zero for both the window starting point and the window stopping point. The window starting point output of memory M7 is supplied to the comparator via output pins 139 and the stopping point output is supplied via output pins 141. The comparator reads output pins 131, 133, 135, 137, 139 and 141 like any other set of switches and uses this data to set and reset the window flip-flop on the feed control circuit. In this example, the window flip-flop would be set when the machine stage reached 69 degrees and would be reset when 79 degrees was reached.

The remaining portion of the length delay circuitry (see FIG. 8) includes three cascaded binary counters 143, 145 and 147, a NAND gate G87, two one-shots 149, 151 and two inverters 153. 155. The preset pins of counters 143, 145 and 147 are connected to the delay switch lines B1, B2, B4 etc. When the output of gate G67 (FIG. 6) in the feed control circuitry goes Low, pin 117 goes Low thereby enabling the counters and presetting the delay length into the counters. From the above description, this occurs whenever an eyespot is detected in the window. These counters are decremented by one each time the encoder goes through another degree. The input to inverter 155 is connected by line L1 to the least significant digit of the encoder output. The output of this inverter is connected to both inverter 153 and one-shot 151. The output of inverter 153 is in turn supplied to one shot 149. Both one shots are connected to the inputs of gate G87. With this arrangement one shot 149 triggers on the rising edge and one shot 151 triggers on the falling edge, thus the output of gate G87 goes High once each degree, thereby providing the proper decrementing rate to the counters. When the counters decrement to zero, which represents the fact that the length delay has expired, the output of the counters goes Low and this Low is supplied via pin 119 to gate G71 (FIG. 6) in the feed control circuitry, which (as explained above) causes the feed clutch to be deenergized and the feed brake to be energized.

Figure 9:
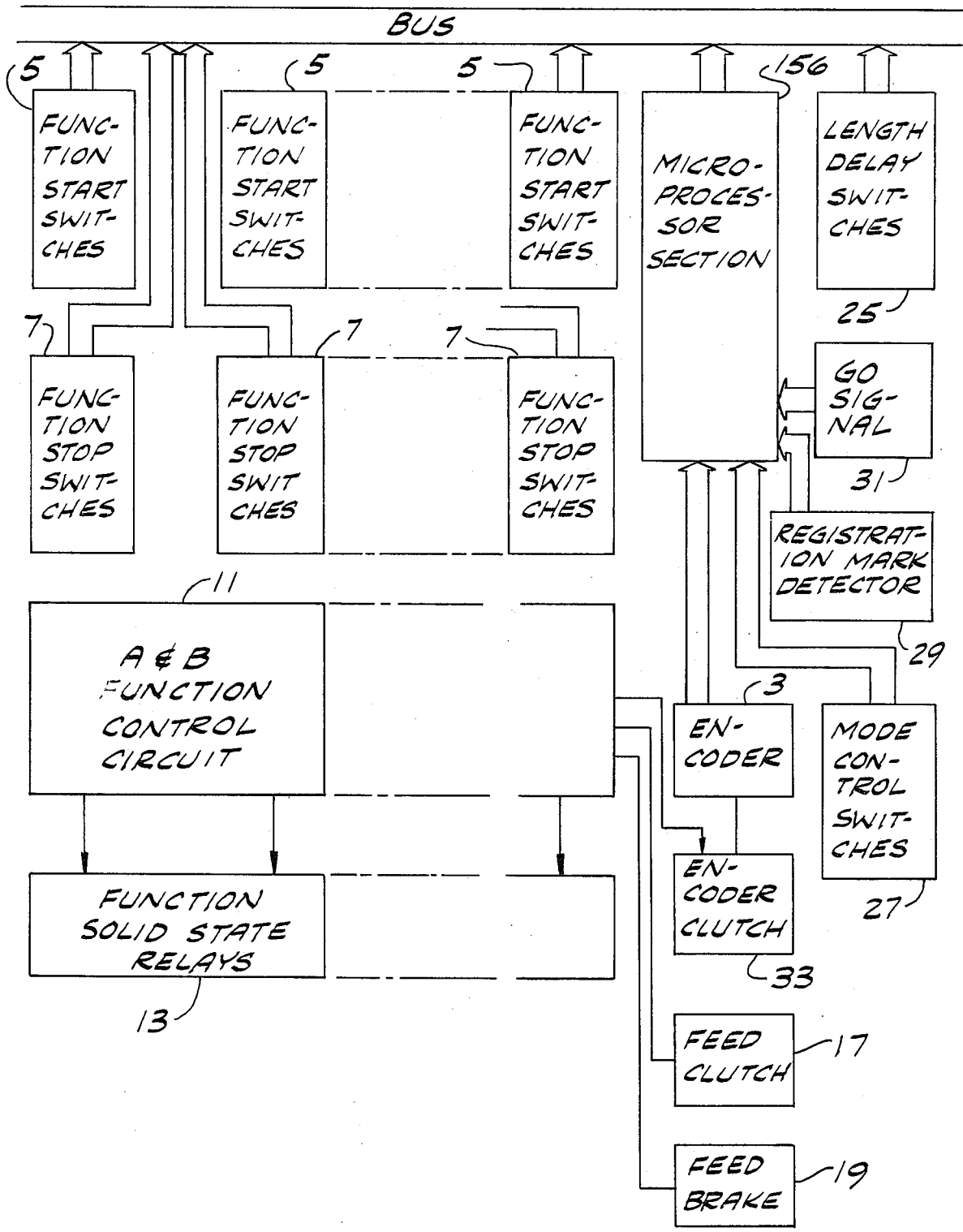
FIG. 9 is a block diagram of a second embodiment of the control system of this invention.

A second embodiment of the present invention is shown in block diagram form in FIG. 9. This embodiment differs from the first embodiment in that a microprocessor section 156 replaces comparator section 9 and length delay circuit 21 and in that feed control is now accomplished with a standard function control circuit such as is shown in FIGS. 5A and 5B instead of a specialized circuit. Referring to the standard control circuit, it should be understood that tri-state buffers could be used in place of the decoupling diodes shown in FIG. 5B.

Figure 10A:
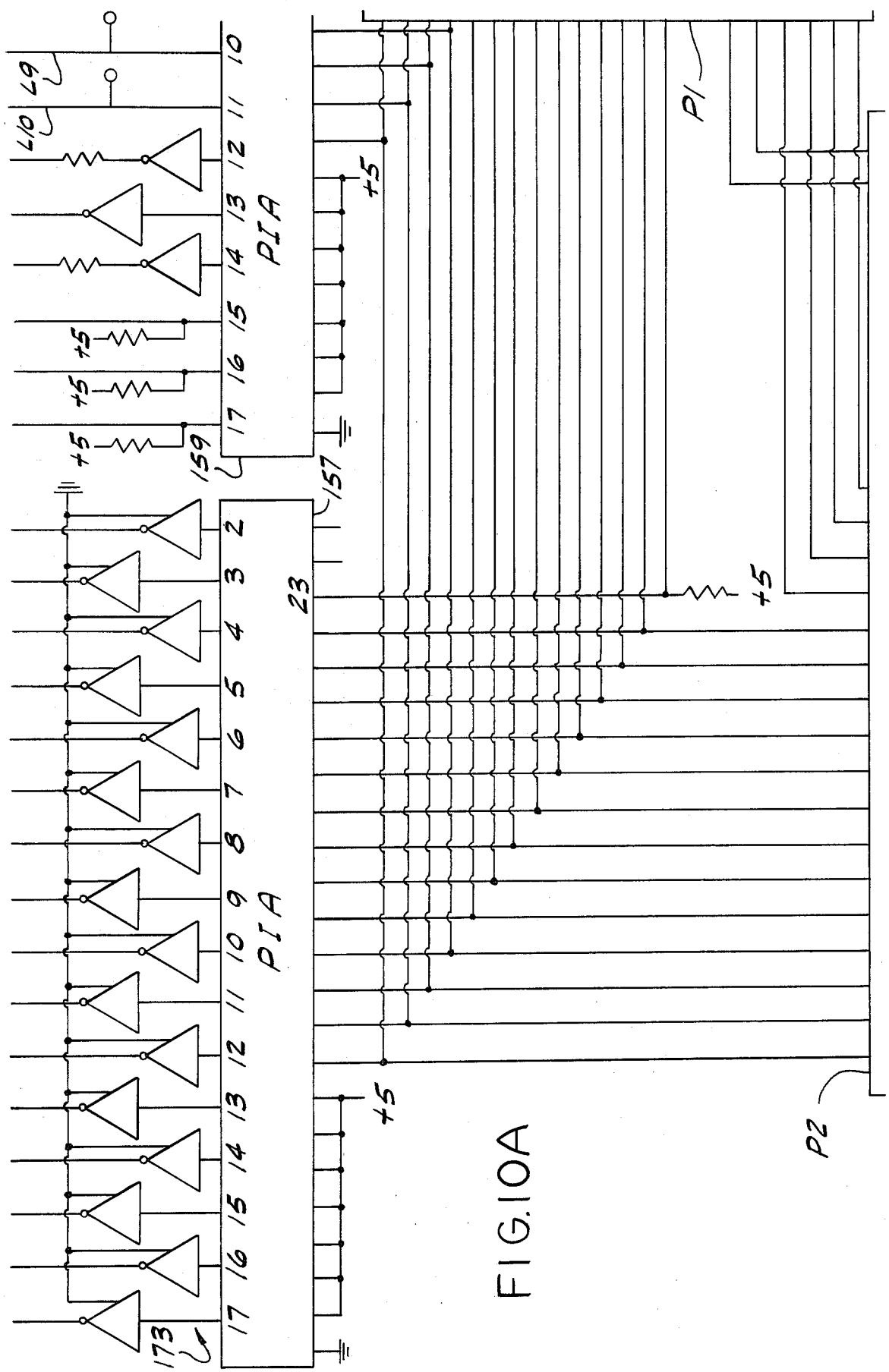
Figure 10B:
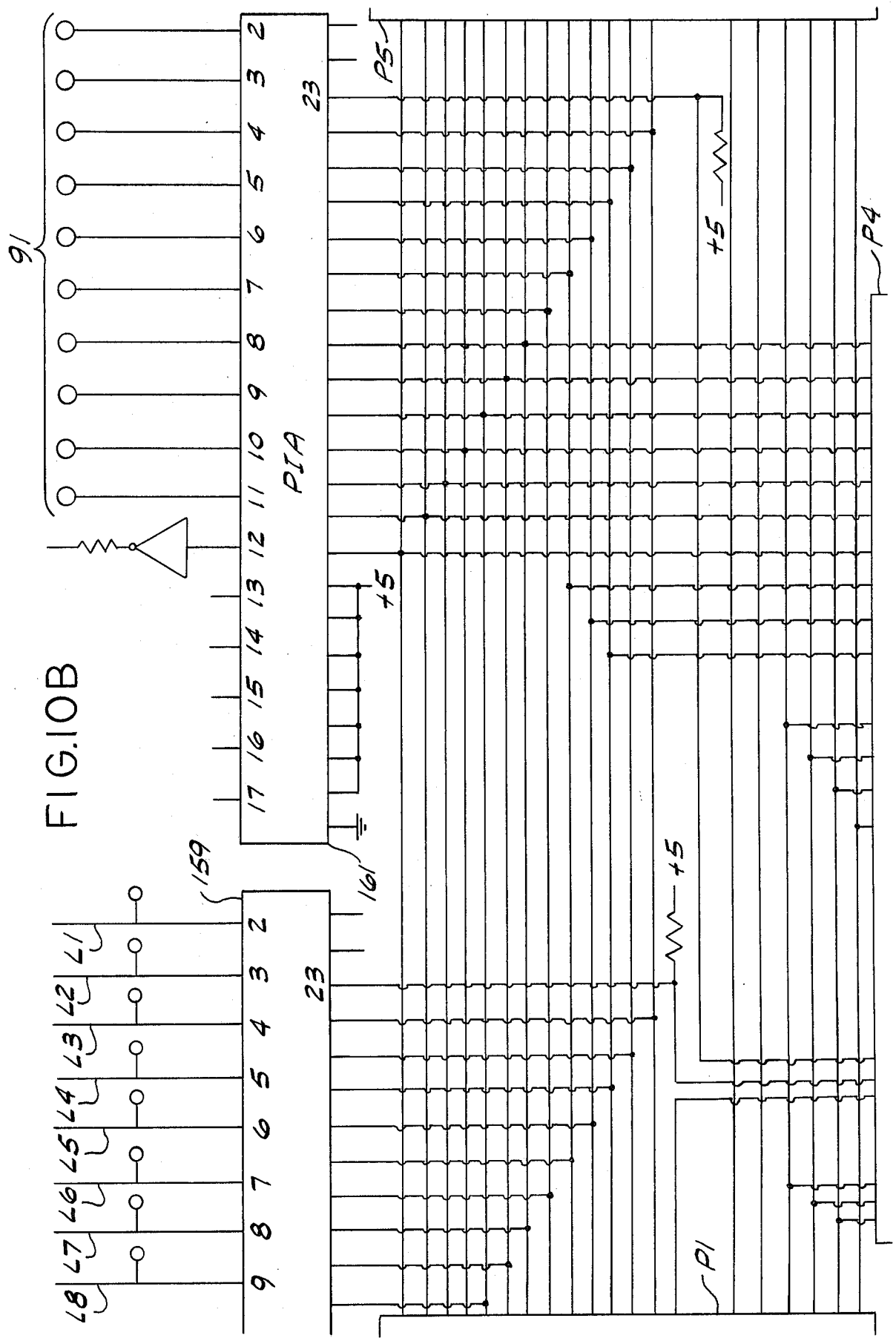
Figure 10E:
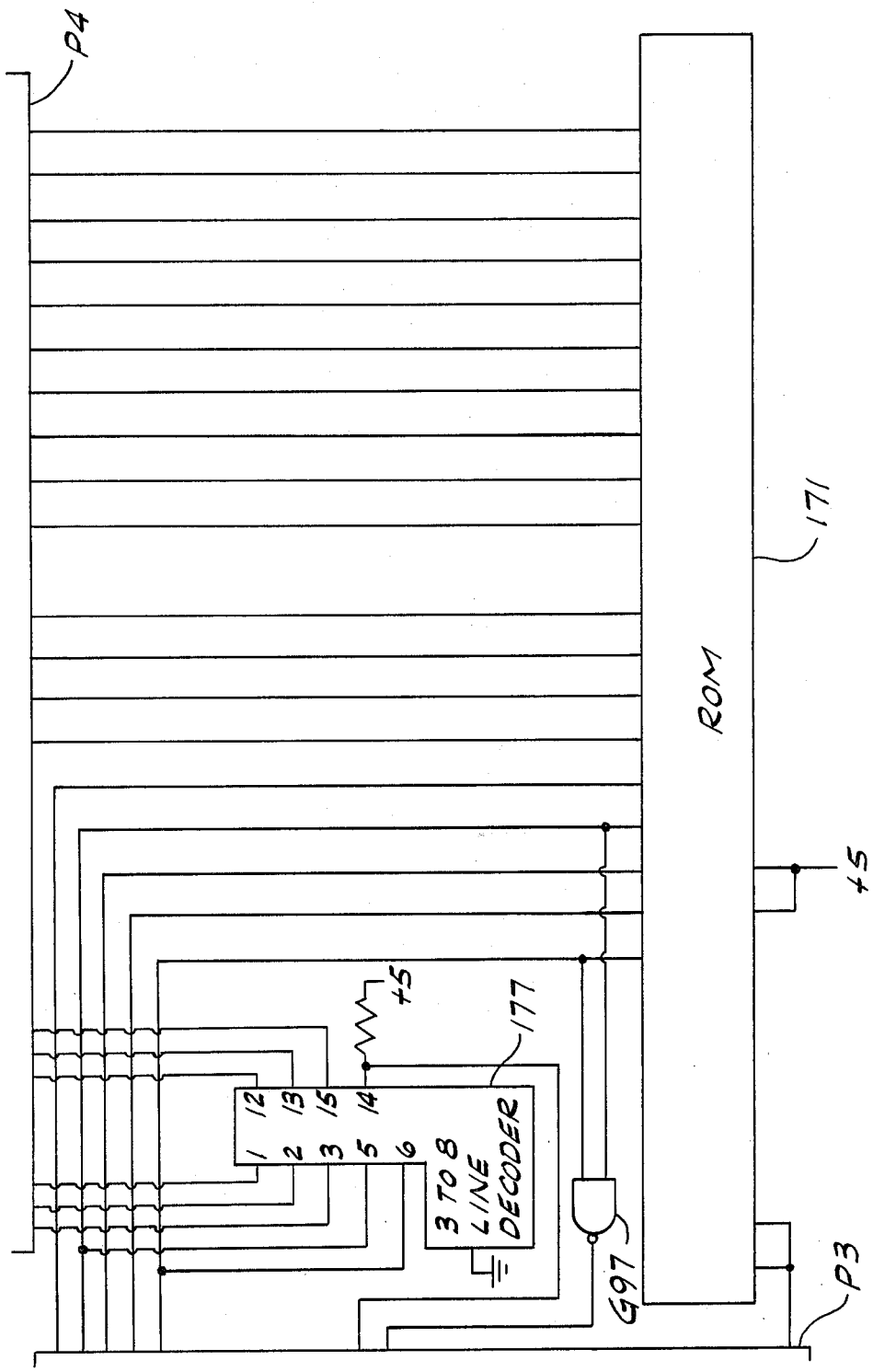

Microprocessor section 156 (FIGS. 10A–10E) includes three 6520-type peripheral interface adapters (PIAs) 157, 159, 161, a 6532-type PIA 163, a 6502-type Rockwell microprocessor (MPU) 165, a 3 MHz clock 167, a hexadecimal counter 169, and a read-only memory (ROM) 171. Plugs P1–P5 are shown connecting the lines of section 157 which extend from sheet to sheet but in fact the lines are continuous. Turning first to FIG. 10A, PIA 157 takes the place of multiplexer 57 of the first embodiment. That is, PIA 157 is used as the multiplexer driver to drive the address lines of the various function circuit, via a set of bus drivers 173. For reference, the outputs of PIA 157 are as follows:

| PIN NO. | FUNCTION |
| --- | --- |
| 2 | CRM*/(FEED + RUN) |
| 3 | SET OUTPUT |
| 4 | CRM* (FEED + RUN) |
| 5 | RESET OUTPUT |
| 6 | ADDRESS 5 |
| 7 | ADDRESS 6 |
| 8 | ADDRESS 3 |
| 9 | ADDRESS 4 |
| 10 | ADDRESS 1 |
| 11 | ADDRESS 2 |
| 12 | ADDRESS 11 |
| 13 | ADDRESS 12 |
| 14 | ADDRESS 9 |
| 15 | ADDRESS 10 |
| 16 | ADDRESS 7 |
| 17 | ADDRESS 8 |

From the above, it is clear that PIA 157 controls all the multiplexed address lines to the function circuits as well as the set, reset, automatic mode and manual mode outputs to said circuits.

The main function of PIA 159 (FIGS. 10A and 10B) is to bring the encoder data (via lines L1–L10) into the system. The pin assignment of PIA 159 is as follows:

| PIN NO. | FUNCTION |
| --- | --- |
| 2 | ENCODER BIT 1 |
| 3 | ENCODER BIT 2 |
| 4 | ENCODER BIT 4 |
| 5 | ENCODER BIT 8 |
| 6 | ENCODER BIT 10 |
| 7 | ENCODER BIT 20 |
| 8 | ENCODER BIT 40 |
| 9 | ENCODER BIT 80 |
| 10 | ENCODER BIT 100 |
| 11 | ENCODER BIT 200 |
| 12 | IN REGISTRATION OUTPUT |
| 13 | 350–359° OUTPUT |
| 14 | OUT OF RANGE INDICATOR |
| 15 | FEED INPUT |
| 16 | CRM INPUT |
| 17 | RUN INPUT |

All pins are inputs except 12, 13 and 14 which are outputs.

PIA 161 (FIG. 10B) has all but one port set as inputs. Its function is to bring the start switch data for each of the functions into the system and to output the fact that the registration detector is on. The pin assignment for this PIA is as follows:

| PIN NO. | FUNCTION |
| --- | --- |
| 2 | START BIT 1 |
| 3 | START BIT 2 |
| 4 | START BIT 4 |
| 5 | START BIT 8 |
| 6 | START BIT 10 |
| 7 | START BIT 20 |
| 8 | START BIT 40 |
| 9 | START BIT 80 |
| 10 | START BIT 100 |
| 11 | START BIT 200 |
| 12 | EYE ON INDICATOR |

PIA 163 (FIG. 10C) has 128 words of scratch pad memory and 16 input/output channels. In this embodiment all the channels are programmed as inputs, as follows:

| PIN NO. | FUNCTION |
| --- | --- |
| 8 | STOP BIT 1 |
| 9 | STOP BIT 2 |
| 10 | STOP BIT 4 |
| 11 | STOP BIT 8 |
| 12 | STOP BIT 10 |
| 13 | STOP BIT 20 |
| 14 | STOP BIT 40 |
| 15 | STOP BIT 80 |
| 24 | STOP BIT 100 |
| 23 | STOP BIT 200 |
| 19 | GO INPUT |
| 18 | PRINT/PLAIN |
| 17 | EYE INPUT |
| 16 | MANUAL PULL |

The primary function of PIA 163 is to bring the data from the stop switches for each function into the system. In addition to the functions indicated above, this PIA also is the scratch pad memory for the system.

Referring to FIG. 10D, clock 167 is shown connected to hexadecimal counter 169. The purpose of this counter is to form a symmetrical square wave clock pulse to be supplied to MPU pin 37 and to divide the clock input frequency by 2, 4 or 8 as desired by connecting pin 37 of the MPU to the appropriate output pin of the counter. In this way, frequencies other than 3 MHz can be utilized with the same circuitry. In addition, it is not necessary with this arrangement to have a symmetrical square wave clock pulse since the counter automatically provides a symmetrical square wave regardless of the input wave form since it only triggers on the leading edge of the wave form. In this particular embodiment of the invention, it is preferred that the clock frequency be 1.5 MHz.

Referring more specifically to the MPU itself, there is shown at 175 an RC network attached to the reset pin of the MPU to ensure that the MPU is automatically reset with no pushbuttons or the like required. The MPU has eight data lines connected to the PIAs and ROM 171 by a bidirectional data bus, and sixteen address lines (only twelve of which are used). The rightmost address pin is used to activate ROM 171. When this pin is High, the output of a NAND gate G91 goes Low, thereby activating ROM 171. ROM 171 contains the program being executed by the MPU and hence this address pin is usually High.

Addressing of the PIAs is accomplished by the rightmost and fourth from the right address pins. When the rightmost pin is Low, the output of gate G91 is High. This output is supplied to pin 6 (one of the enable inputs) of a 3-to-8 line decoder 177. The fourth from the right address line is connected to pin 5 of decoder 177 (the other enable pin) and when this pin is Low, decoder 177 is enabled. Once enabled, the output of decoder 177 is determined by three other address lines which are connected to pins 1, 2 and 3 of the decoder. When all three lines are Low and the decoder is enabled, pin 15 of the decoder (which is connected to pin 23, the enable pin, of PIA 161) goes Low, thereby selecting PIA 161. When the first of the address lines is High, pin 14 of the decoder goes Low. This forces the output of a NAND gate G93 High and the output of a second NAND gate G95 Low. The Low output of gate G95 is supplied to pin 37 of PIA 163, thereby selecting that PIA. Similarly, PIA 159 is selected by the second address line going High and PIA 157 is selected by the first and second address lines going High. It is preferred that the address lines be chosen such that the address of the PIAs are located in the lowest 256 locations in memory because this allows them to be referenced with only two memory instructions.

Addressing of the scratch pad memory in PIA 163 uses the same two address lines of the MPU. Whenever the rightmost line is Low and the other of these address lines is High, both inputs of a NAND gate G97 are High. Its output is forced Low. This Low is supplied to a chip enable pin 36 of PIA 36 and also to an input of gate G93. As a result, pin 37 is also forced Low as before. When both pins 36 and 37 are Low, the scratch pad memory is addressed.

Figure 11B:
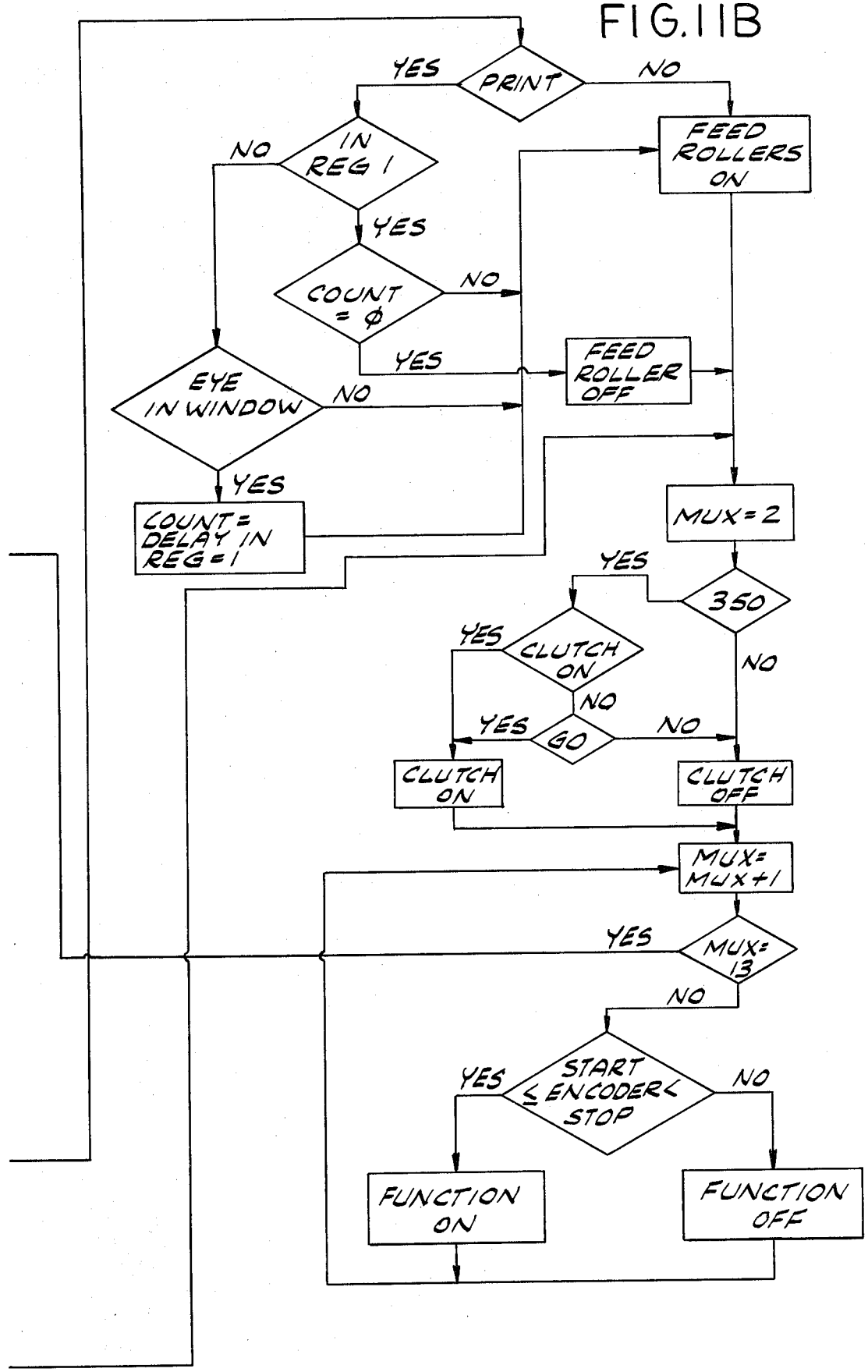

The program for MPU 165 follows the flow-chart shown in FIGS. 11A and 11B. On start up, the system is initialized, i.e., counters are cleared, pointers are initialized, etc. The next step is to see if the main power relay (CRM) is on. If not, the automatic and manual mode outputs are turned off. The program continues through all the functions in this case but because the automatic and manual mode outputs are off no outputs will be turned on. Once the master relay is on the program next checks to see if either feed or run is on. If so, the machine is in the automatic mode. If not, it is in manual. In either case, the appropriate output (manual or automatic) is set and the program continues.

The next step is to compare the encoder value with the value from the previous pass through the program. If the encoder value has not changed, the value (which is stored so that all comparisons made during the same pass through the program are made to the same encoder value) is kept and the program continues. If not, the stored value is changed, and a delay checking loop is entered. If the machine is not in the print mode, the loop is exited and the program continues. If the machine is in the print mode, the in registration flag is checked. If it is on the loop is continued; if not, it is exited. Finally, the delay counter is checked and if it is not zero, the delay counter is decremented. The two branches of the program now converge. If the machine is in both the automatic and print modes, the delay counter is serviced and then the multiplexer (PIA 157) is set to address the first address.

For this particular embodiment, the first address is the feed control circuit. As mentioned above, in this embodiment the feed control circuit uses the standard function control circuit shown in FIGS. 5A and 5B. To do this all logic decisions are done by the MPU. The A output of the function board selected as the feed function board controls the feed clutch and feed brake and the A switches provide the starting and stopping points for the feed function. The start switches of the B function are used to set the length delay for the system and the stop switches of the B function are unused. The output of the B function is used to drive the encoder clutch. The A enable and B enable inputs are wired Low for the feed control circuit since these functions must be enabled at all times.

Thus, once the feed roller function is addressed in the program (by setting MUX=1), the next step is to compare the encoder value with the preset starting and stopping points of the feed function. If the encoder value is not within the preset range, the feed rollers are turned off (by deenergizing the feed clutch). If the encoder is somewhere between the preset starting and stopping points, the next step is to determine whether the machine is in the print mode. If not, the feed rollers are turned on and the program continues. If in the print mode, the in registration flag is checked. If it is not on, a check is made to see if the registration mark is being detected in the window. If not, the feed rollers are turned on and the program continues. If the eyespot is seen in the computed window, the delay counter is set to the delay setting (from the B start switches on the feed control circuit) and the feed rollers are turned on. As soon as the eyespot is seen in the window, the in registration indication is given. Therefore, only the leading edge of the eyespot causes the loading of the delay. In this way, the system is insensitive to eyespot width.

If the machine is in the print mode and the in registration flag is on, the delay count is checked to see if it is zero. If not, the feed rollers are turned on and the program continues. If the delay count does equal zero, the length delay has been decremented and therefore the feed rollers are turned off.

Once the feed rollers have been either turned on or off, the multiplexer output is set to two. This addresses the encoder clutch function and enables the next cycle to be initiated. If the encoder value is not greater than or equal to 350 degrees, the clutch output (function B on the feed control circuit board) is turned off and the program continues. If the encoder value is greater than or equal to 350 degrees, the clutch output is examined to see if it is already on. If so, it is left on and the program is continued. This latches the clutch on until the encoder gets to zero degrees. At that point, the clutch function is automatically forced off. If, on the other hand the encoder value is greater than or equal to 350 degrees but the clutch output is not on, the GO signal from the feed system or the take-away system is examined. If the GO signal is present, the clutch is turned on and the program continues. If not, the encoder clutch is not yet turned on. This particular function (control of the encoder clutch) does not depend upon any values set on start or stop switches.

After servicing the encoder clutch, the remaining functions are performed. In particular the output multiplexer output is incremented by one and the result is compared with the total number of functions plus one to see if all the functions (in this case twelve) have been checked. If all the functions have been checked, the program returns to its beginning. If not, the start and stop switches for the next function are compared to the encoder value. If the encoder value falls within the preset range for that function, the function is turned on. If not, it is turned off. In either case, the next step is to increment the multiplexer once again. The program continues through this loop until all the functions have been serviced at which time it returns to the beginning of the program and recommences execution of the program. It has been found that with this system, resolution of one degree can be achieved at speeds of up to 250 rpm.

From the above, it will be appreciated that the encoder constitutes means for generating values representing the stages of a machine in its cycle as the machine progresses through a cycle and that switches 5 and 7 constitute means for presetting starting and stopping points in the cycle for at least one of the functions of the machine in terms of the stage values. Furthermore, comparator section 9 in the first embodiment and the MPU in the second embodiment constitute means for comparing the value representing the stages of the machine in its cycle with the preset starting and stopping point values. Each function control circuit constitutes means for initiating and maintaining its respective machine function when the encoder values are greater than the preset starting point value but are less than the preset stopping point value for that function and for stopping said machine function when the encoder values representing the stages of the machine in its cycle equal or are greater than the preset stopping point value for that function. And the encoder clutch in conjunction with the feed control circuit constitutes means for idling the machine, thereby retaining the machine at the respective stage in its cycle and holding the value comparison substantially the same, and for recommencing cyclic operation of the machine.

It should also be appreciated that length delay switches 25 constitute means for setting a predetermined delay length of tubing to be fed past the sealing means of the machine after detection of a registration mark before sealing of a package occurs. That is, for each package, sealing occurs only after the detection of the corresponding eyespot and the subsequent feeding of the predetermined length of packaging material through the machine and, in particular, past the sealing bars. Moreover, delay switches 25 in conjunction with the pull or feed stop switches 7 and the feed control circuitry of the first embodiment of the MPU of the second embodiment constitute means for accepting signals from the registration mark detector only while predetermined portions of the tubing are being fed past the detector, thereby ensuring that only registration marks within the predetermined portion (i.e., the window) of the tubing are detected. In the first embodiment memories M1, M3, M5 and M7 and in the second embodiment the MPU constitute means responsive to the pull or feed stop switches and the delay switches to signal the accepting means to accept the sensor (registration mark detector) signals at the stage in the cycle prior to the preset stopping point an amount equal to the delay length plus the length of the window. The circuitry of FIG. 8 constitutes means for determining when the delay length of tubing has passed the sealing means after detection of the registration mark and in conjunction with the feeding circuit constitutes means for stopping the feeding of the tubing after the delay length has passed the sealing means to allow sealing of the tubing at that point. The MPU in the second embodiment and the feed control circuit in the first embodiment also constitute means responsive to an external signal for terminating the idling of the machine and recommencing cyclic operation. The function control circuits constitute logic circuits for initiating their respective functions in response to a predetermined signal (the set signal) and maintaining the function until receipt of a second predetermined signal (the reset signal).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. The method of controlling apparatus for sealing packages wherein a web of flexible packaging material having a series of registration marks is formed into tubing and fed past sealing means for sealing the tubing to form packages, comprising:
   presetting a predetermined delay length of tubing to be fed past the sealing means;
   initiating web feeding;
   detecting a registration mark;
   feeding said predetermined delay length past the sealing means in response to said detection of a registration mark before sealing of the tubing, said predetermined delay length being substantially independent of the rate at which packaging material is fed past the sealing means;
   determining when the predetermined delay length of tubing has passed the sealing means after detection of said registration mark;
   stopping the feeding of material past the sealing means in response to said predetermined delay length's having passed the sealing means;
   actuating the sealing means; and reinitiating feeding of the web.

2. The method as set forth in claim 1 wherein the determining step includes the step of generating and supplying signals indicative of the length of tubing fed past the sealing means, said method further including the steps of setting a maximum length of tubing to be fed past the sealing means per package and of controlling the sealing means to seal the tubing if said maximum length of tubing is fed past the sealing means.

3. The method as set forth in claim 1 wherein the detecting step includes the step of accepting signals from a sensor for detecting said registration marks only while predetermined portions of the tubing of a predetermined length are being fed past the sensor, thereby ensuring that only registration marks within said predetermined portions of the tubing are detected, said sensor signals being accepted starting when the distance between the most recently formed seal and the sealing means equals the maximum length of tubing per package minus the length of the predetermined portions minus the delay length.

4. The method as set forth in claim 3 wherein the sensor signals cease being accepted when the distance between the said most recently formed seal and the sealing means equals the maximum length of tubing per package minus the delay length.

5. The method as set forth in claim 3 further including the step of storing data in an electronic memory representing the start of the predetermined portions of tubing for each of a plurality of combinations of possible values of the delay length and the maximum length.

6. The method as set forth in claim 5 wherein sensor signals are not accepted until the distance between said most recently formed seal and the sealing means corresponds to the data stored in the electronic memory for the particular delay length and maximum length of tubing per package.

7. The method as set forth in claim 1 wherein the determining step includes the step of storing a value representing the predetermined delay length and decrementing said value as tubing is fed past the sealing means after detection of the registration mark in proportion to the length of tubing so fed.

8. In apparatus for sealing packages wherein a web of flexible packaging material having a series of registration marks is formed into tubing and fed past sealing means for sealing the tubing to form packages, an improved control system comprising:

means for feeding the tubing past the sealing means;
sensor means for detecting the registration marks;
delay means for setting a predetermined delay length of tubing to be fed past the sealing means in response to detection of a registration mark, said predetermined delay length being substantially independent of the rate at which packaging material is fed past the sealing means; and
means responsive to the sensor means for determining when the predetermined delay length of tubing has passed the sealing means after detection of said registration mark and for stopping the feeding of the tubing after said predetermined length of tubing has passed the sealing means to allow sealing of said tubing at that point.

9. A control system as set forth in claim 8 wherein the determining means includes length means for supplying signals indicative of the length of tubing fed past the sealing means, said control system further including means for setting a maximum length of tubing to be fed past the sealing means per package, and controlling means responsive to the maximum length setting means and to the length means for controlling the sealing means to seal the tubing if said maximum length of tubing is fed past the sealing means.

10. A control system as set forth in claim 9 further including means for accepting signals from the sensor means only while predetermined portions of the tubing of a predetermined length are being fed past the sensor means, thereby ensuring that only registration marks within said predetermined portions of the tubing are detected, said sensor signals being accepted starting when the distance between the most recently formed seal and the sealing means equals the maximum length of tubing per package minus the length of the predetermined portion minus the delay length.

11. A control system as set forth in claim 10 wherein the delay means includes a manually operable delay switch having a plurality of settings and the maximum length setting means includes a manually operable maximum length setting switch having a plurality of settings, the setting of the delay switch representing the predetermined delay length and the setting of the maximum length setting switch representing the maximum length of tubing to be fed past the sealing means per package.

12. A control system as set forth in claim 11 further including a read only memory containing for each of a number of possible pairs of values of the delay length and the maximum length a number corresponding to that particular delay length and that particular maximum length representing the distance from the end of the package at which signals from the sensor means are first accepted.

13. A control system as set forth in claim 9, further including means for accepting signals from the sensor means only while predetermined portions of the tubing of a predetermined length are being fed past the sensor means, said sensor signals being no longer accepted when the distance between the end of the package and the sealing means equals the maximum length of tubing per package minus the delay length.

14. A control system as set forth in claim 8 wherein the determining means includes means for storing a value representing the predetermined delay length and for decrementing said value as tubing is fed past the sealing means after detection of the registration mark in proportion to the length of tubing so fed.

15. A control system as set forth in claim 14 wherein the storing and decrementing means includes a counter.

* * * * *